(12) United States Patent  (10) Patent No.: US 6,906,930 B2
Jang et al.  (45) Date of Patent: Jun. 14, 2005

(54) STRUCTURE AND METHOD FOR AN ISOLATED BOOST CONVERTER

(75) Inventors: Yungtaek Jang, Apex, NC (US); Milan M. Jovanovic, Cary, NC (US)

(73) Assignee: Delta Electronics, Inc., Taipei (TW)

( * ) Notice: Subject to any disclaimer, the term of this patent is extended or adjusted under 35 U.S.C. 154(b) by 0 days.

(21) Appl. No.: 10/608,314

(22) Filed: Jun. 26, 2003

(65) Prior Publication Data

US 2004/0264224 A1 Dec. 30, 2004

(51) Int. Cl.[7] .............................................. H02M 3/335
(52) U.S. Cl. ..................................... 363/17; 363/56.02
(58) Field of Search ............................. 363/15–17, 97, 363/98, 131, 132, 40, 56.02, 56.05

(56) References Cited

U.S. PATENT DOCUMENTS 6,191,957 B1 * 2/2001 Peterson ...................... 363/17
6,256,209 B1 * 7/2001 Gurwicz et al. ............... 363/17
6,452,815 B1 * 9/2002 Zhu et al. ...................... 363/17
6,466,458 B2 * 10/2002 Zhang et al. .................. 363/17
6,507,176 B2 * 1/2003 Wittenbreder, Jr. ......... 323/259
6,538,906 B1 * 3/2003 Ke et al. ................. 363/21.02

* cited by examiner

*Primary Examiner*—Gary L. Laxton
(74) *Attorney, Agent, or Firm*—MacPherson Kwok Chen & Heid LLP

(57) ABSTRACT

An isolated boost converter includes first and second switches that are switched simultaneously, a transformer and an energy storage capacitor on the primary side of the transformer for storing energy received from input power source. In one embodiment, when the first and second switches are closed, the energy in the capacitor is transferred to the output load while a boost inductor is charged, and when the first and second switches are open, the boost inductor provides energy from the input voltage source to supply the load and to charge the capacitor, In one embodiment, a third switch is provided to relieve the voltage stress on the secondary side.

80 Claims, 39 Drawing Sheets

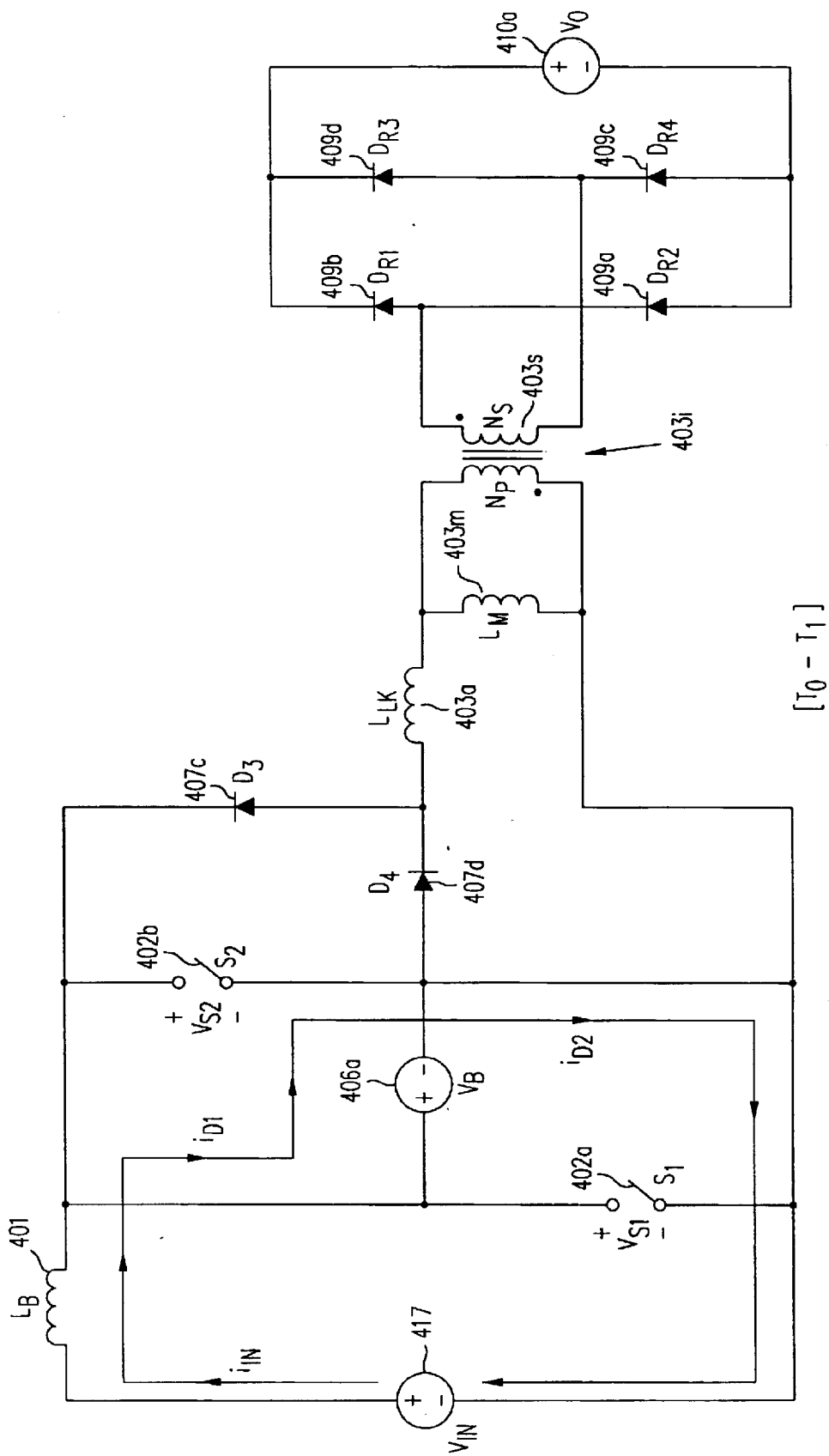
FIG. 6a [T₀ - T₁]

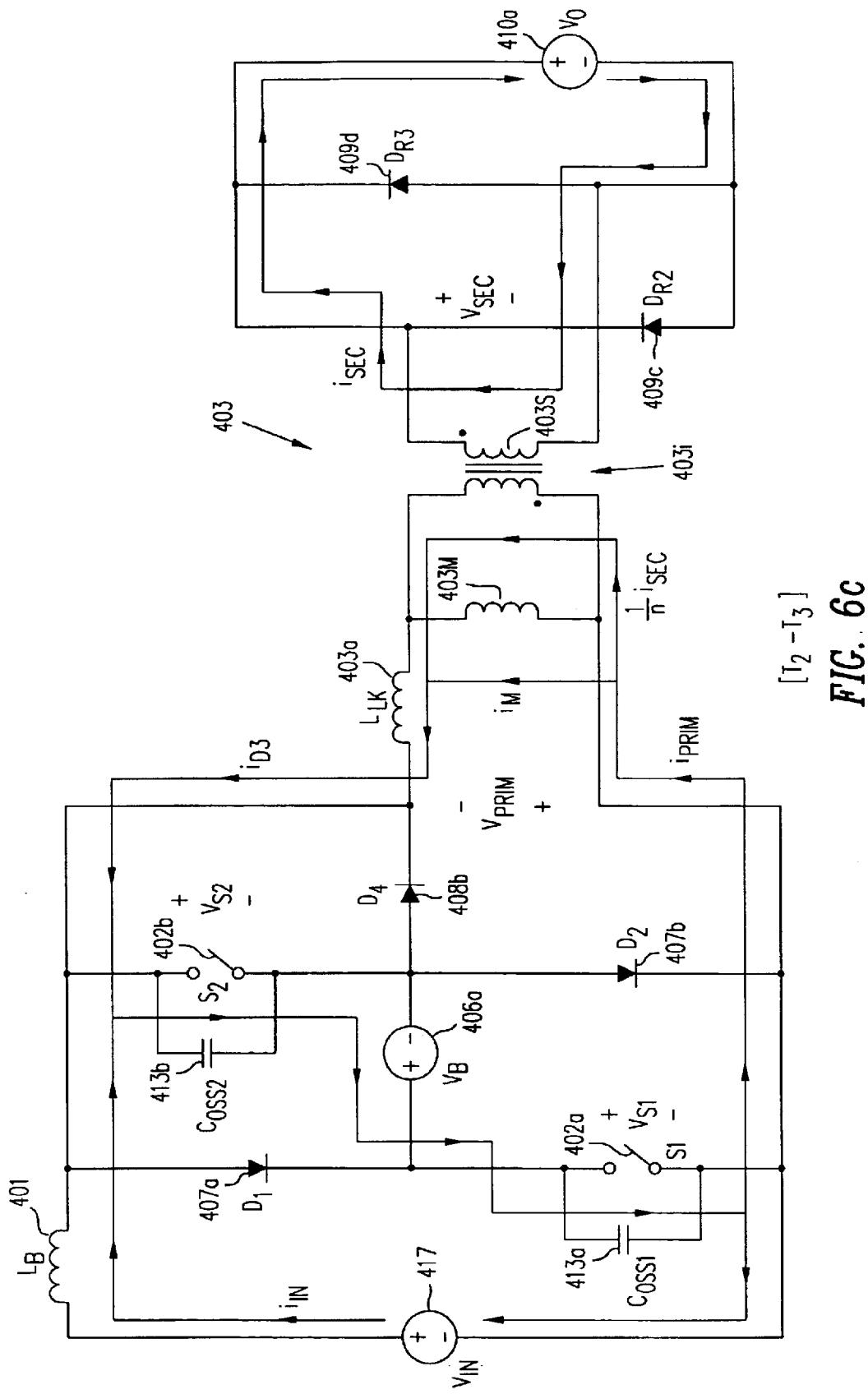
FIG. 6c [T₂-T₃]

[T₃ - T₄]

[T4-T5]

[T₆–T₇]

[T7-T8]

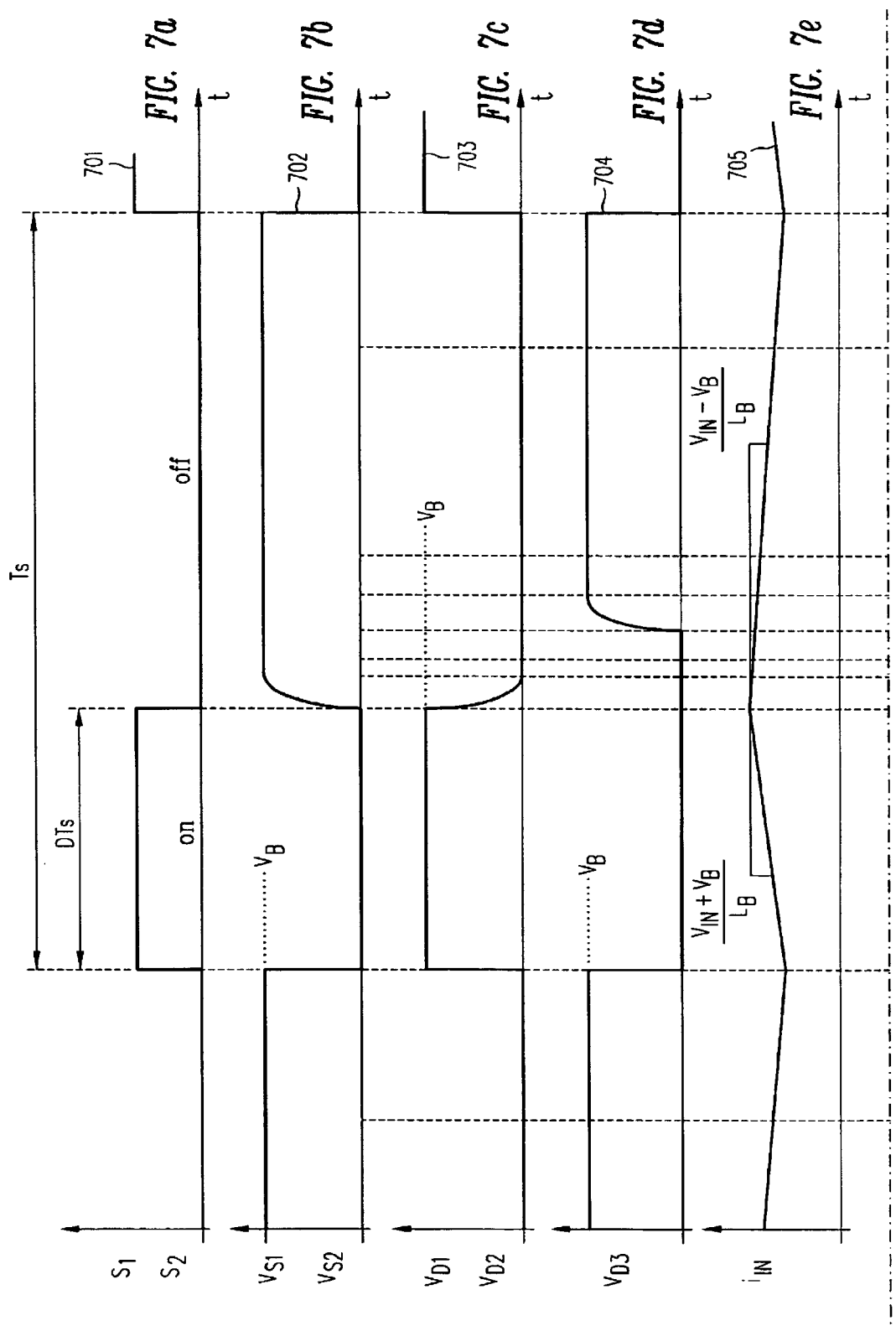

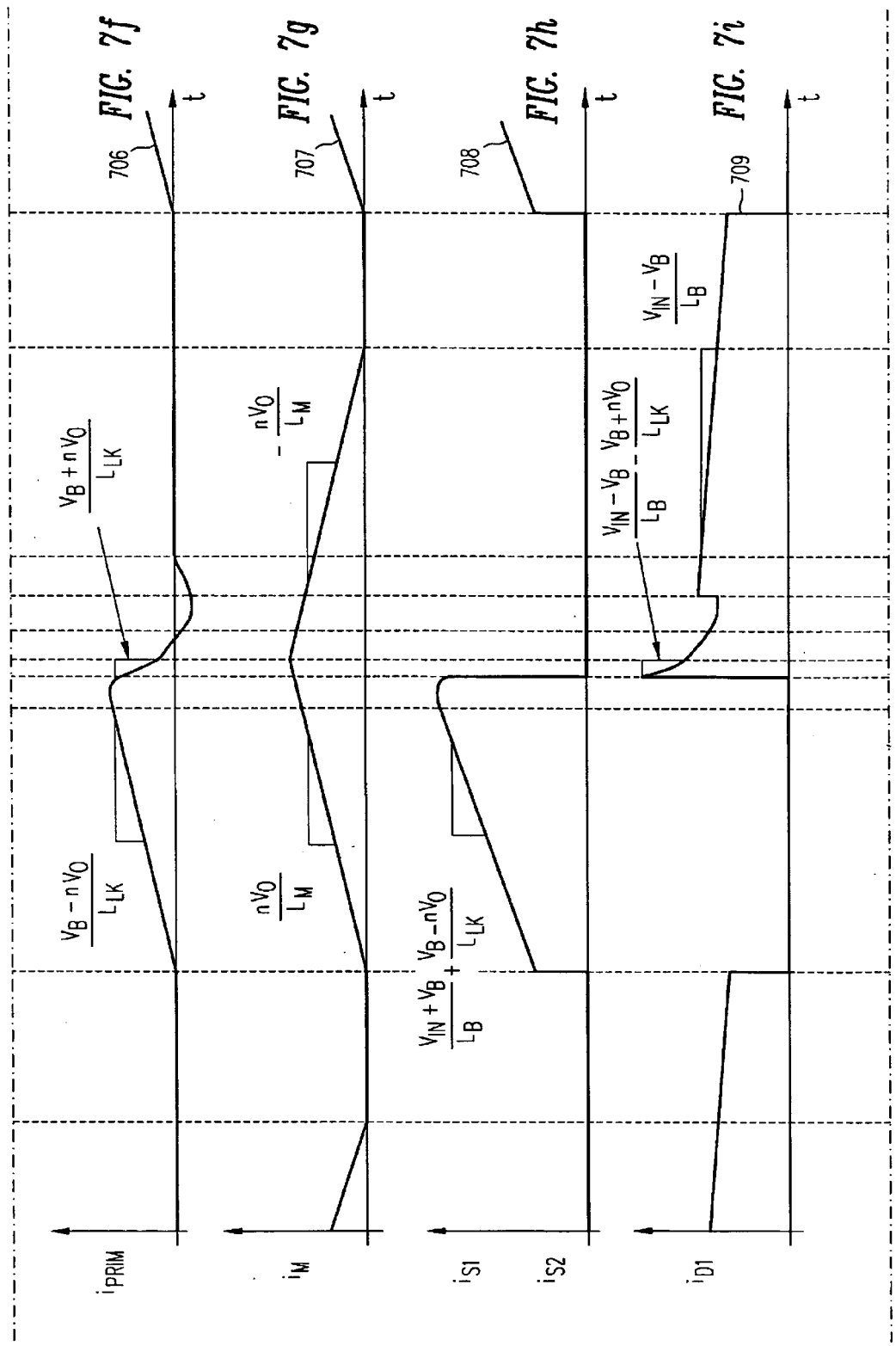

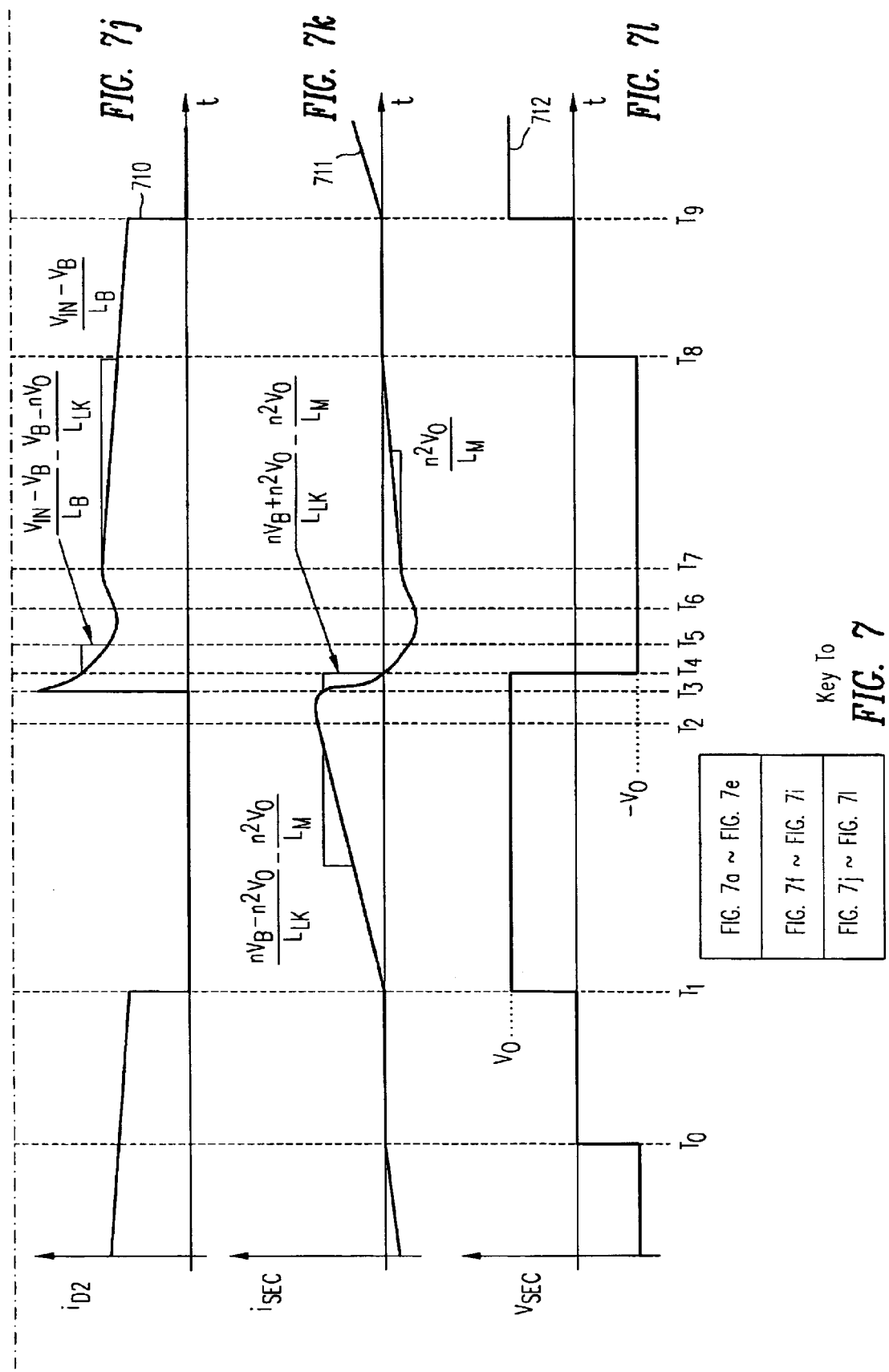

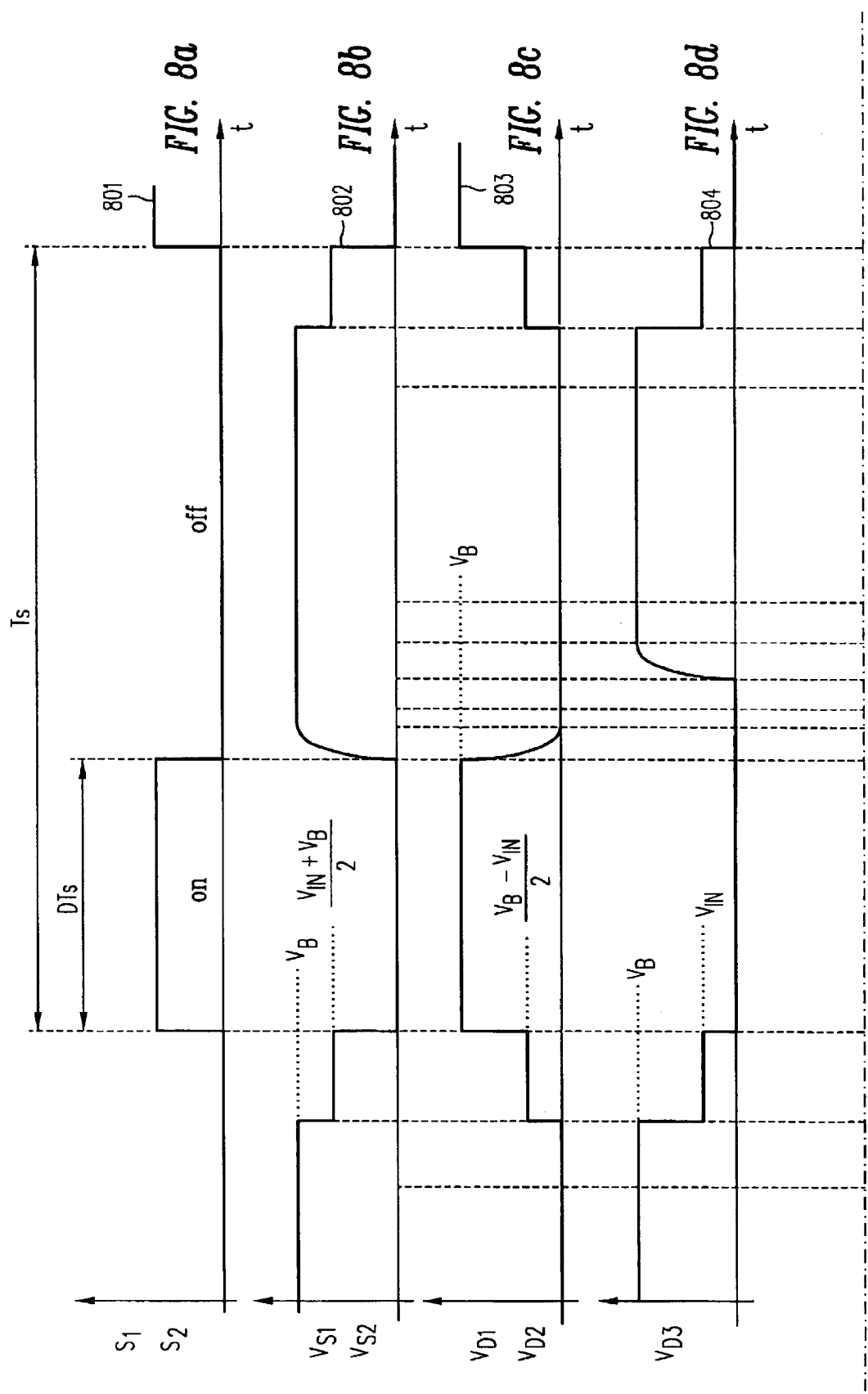

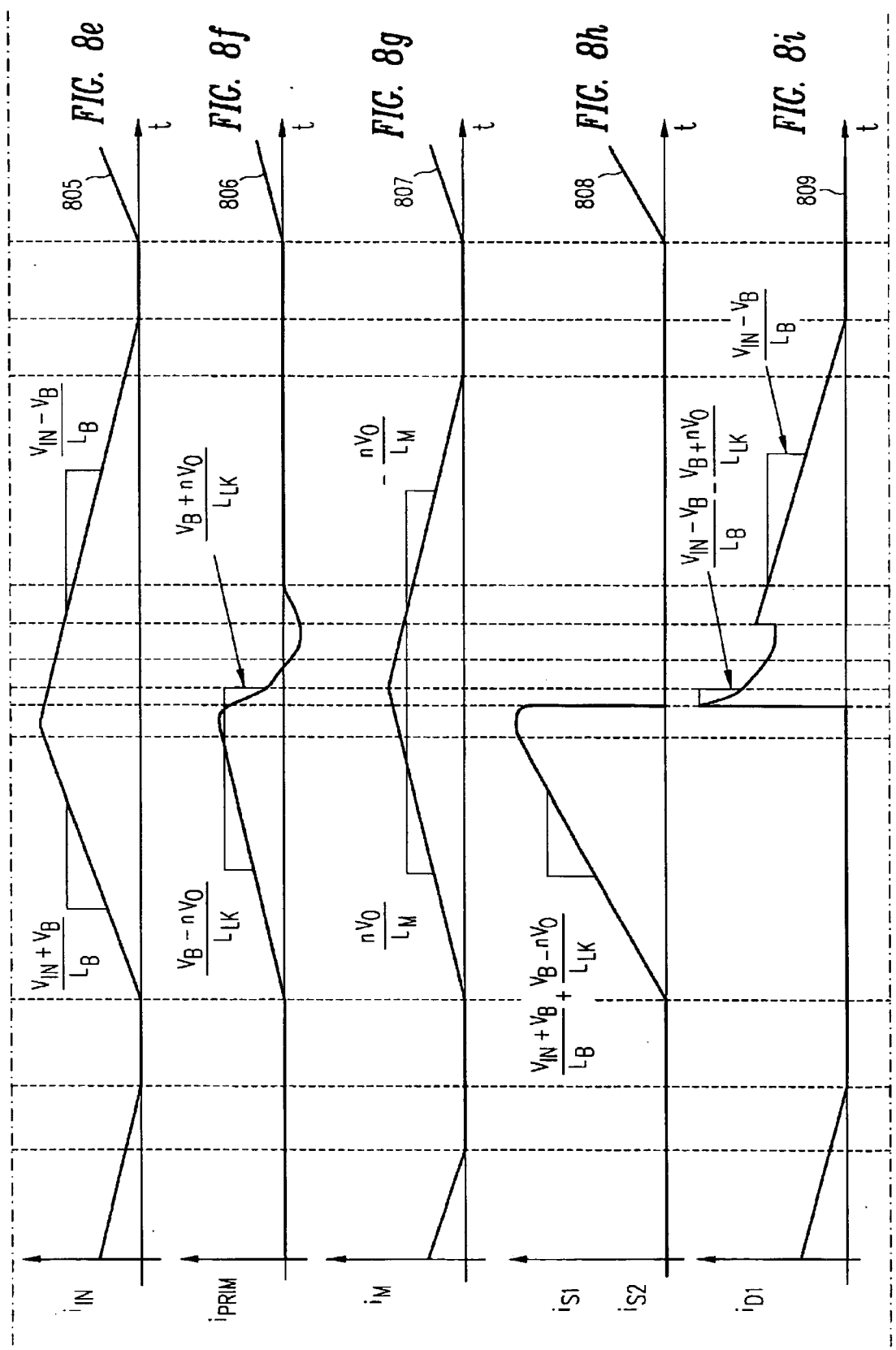

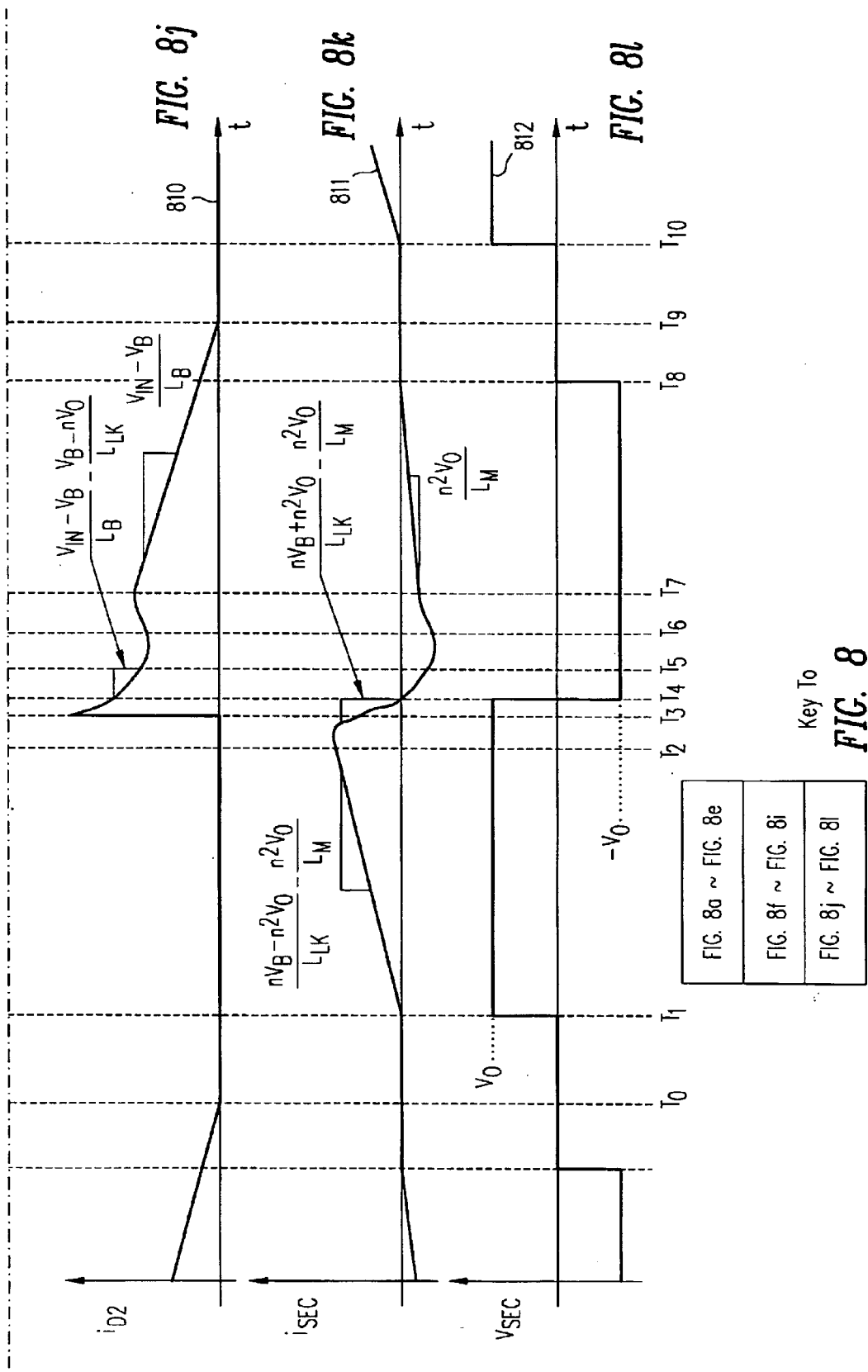

$[T_1-T_2]$

[T₂-T₃]

[T₃–T₄]

[T₇–T₈]

[T9-T10]

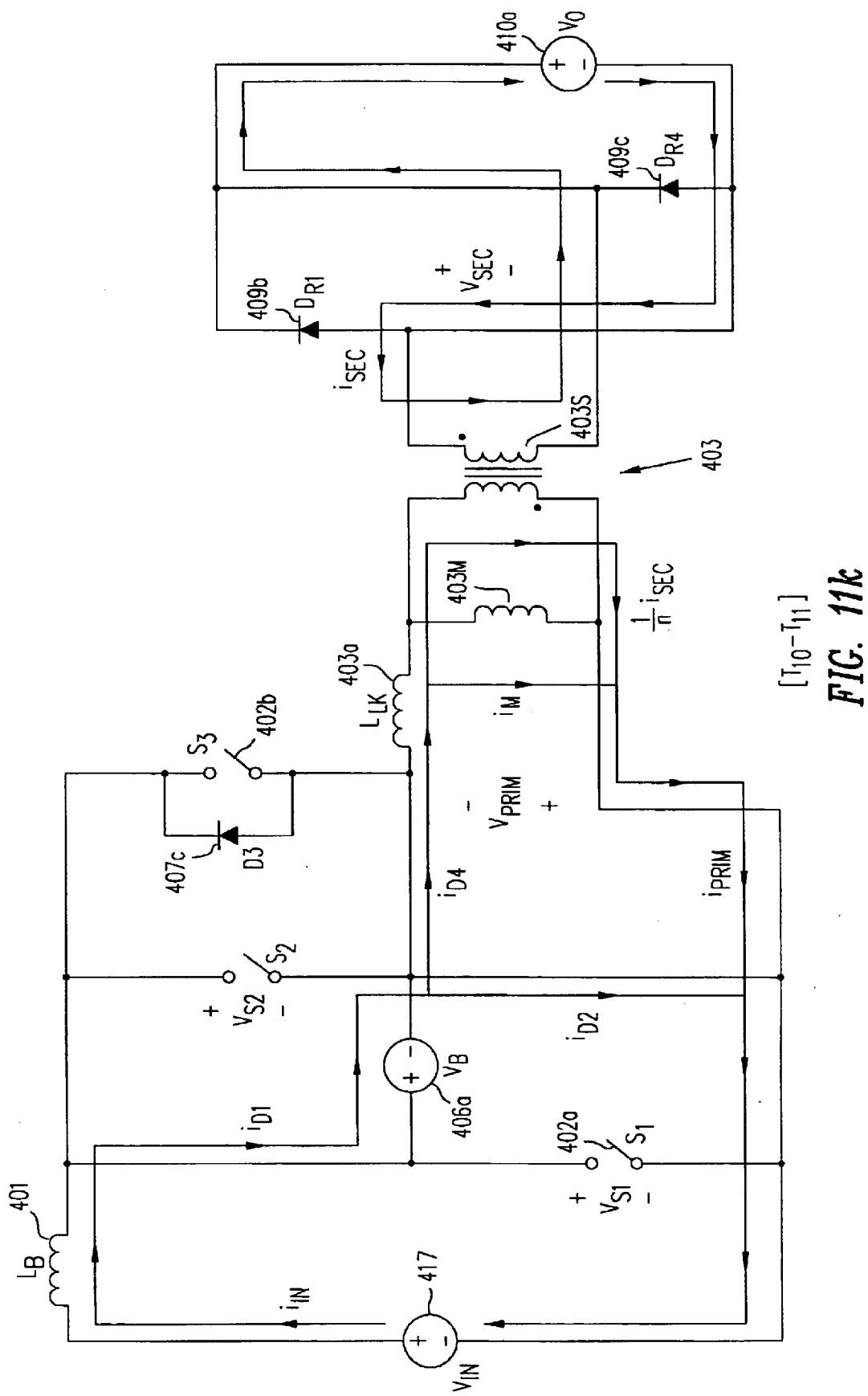
FIG. 11k  [T₁₀–T₁₁]

[T11-T12]

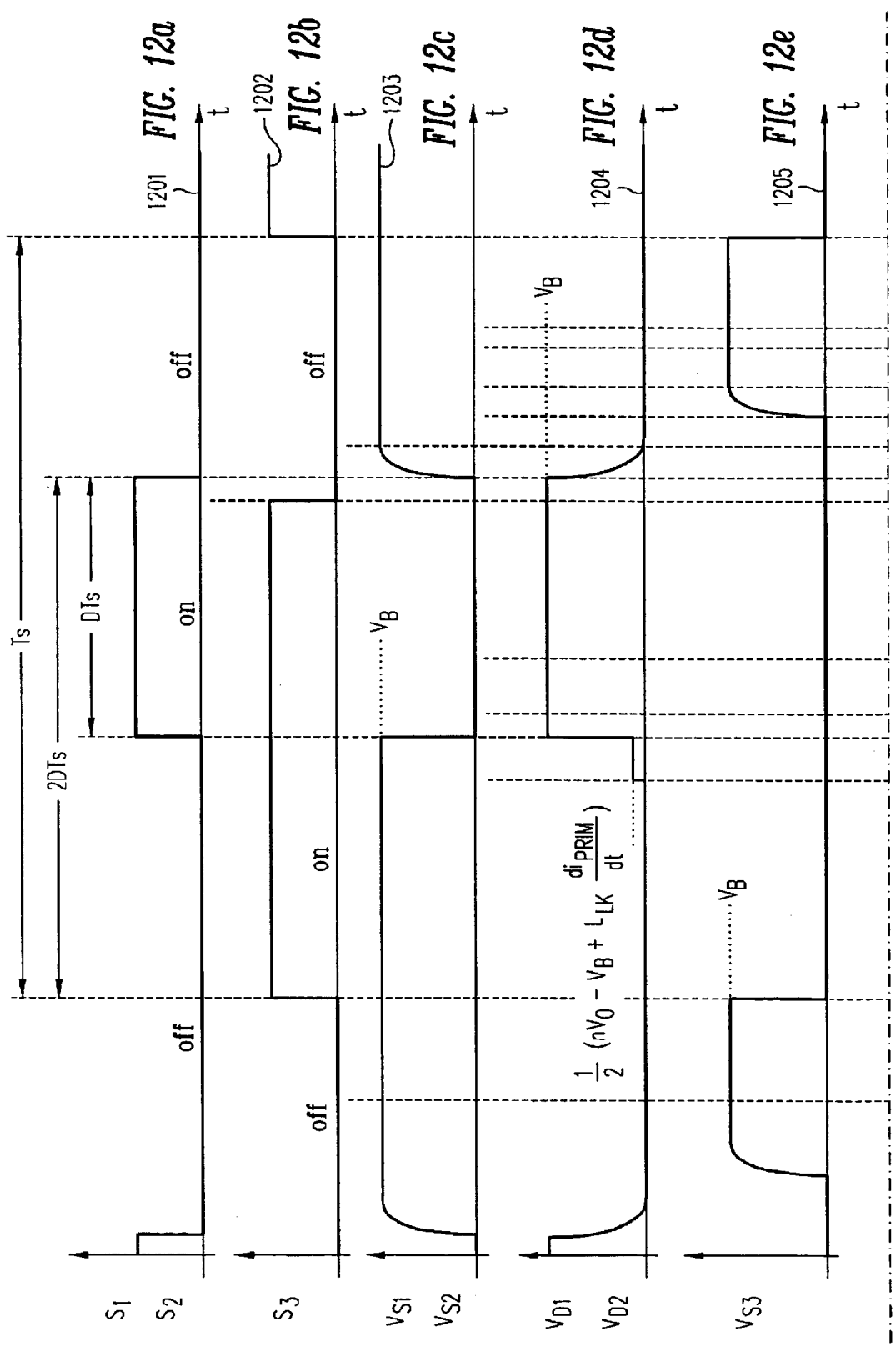

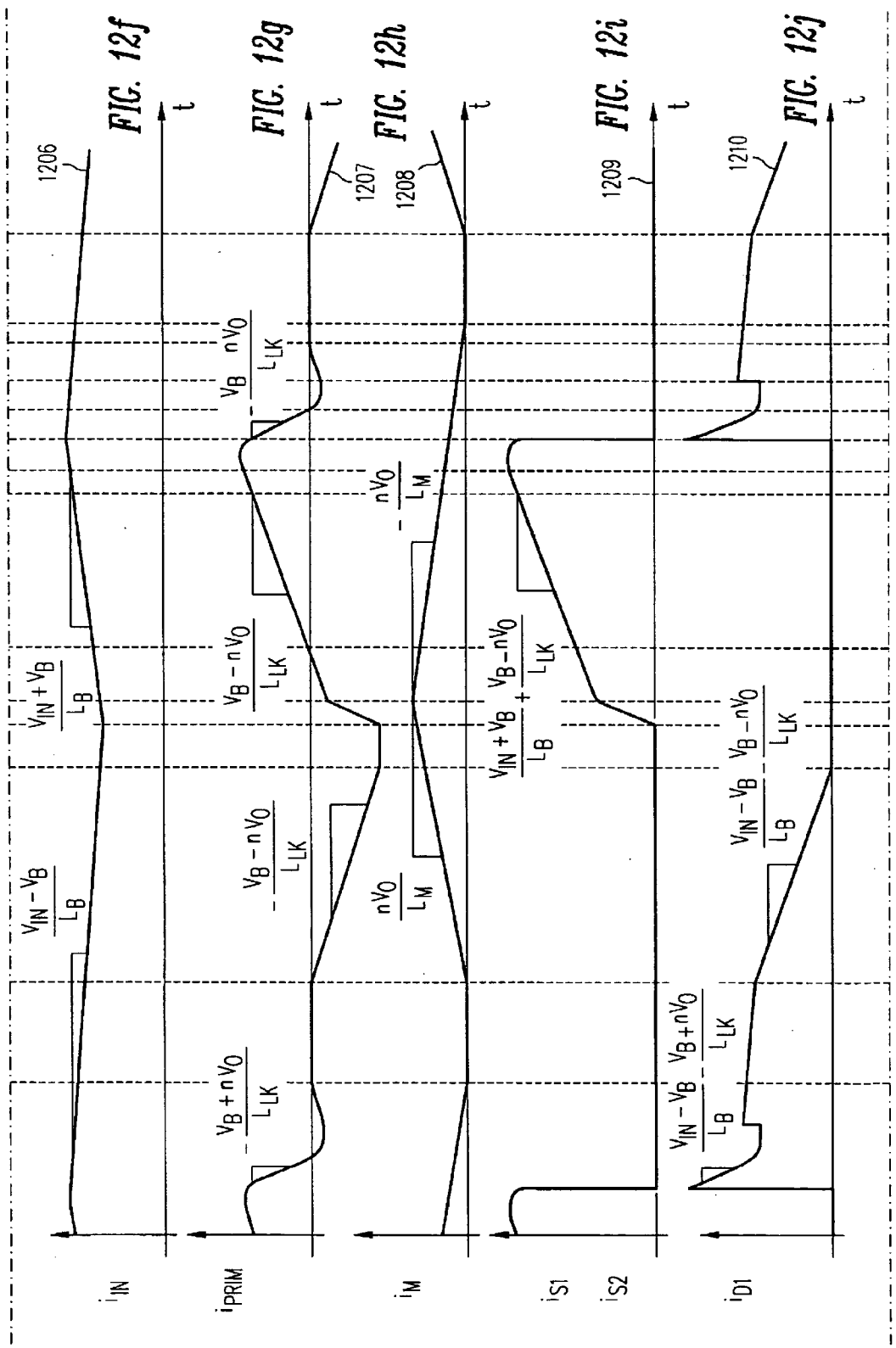

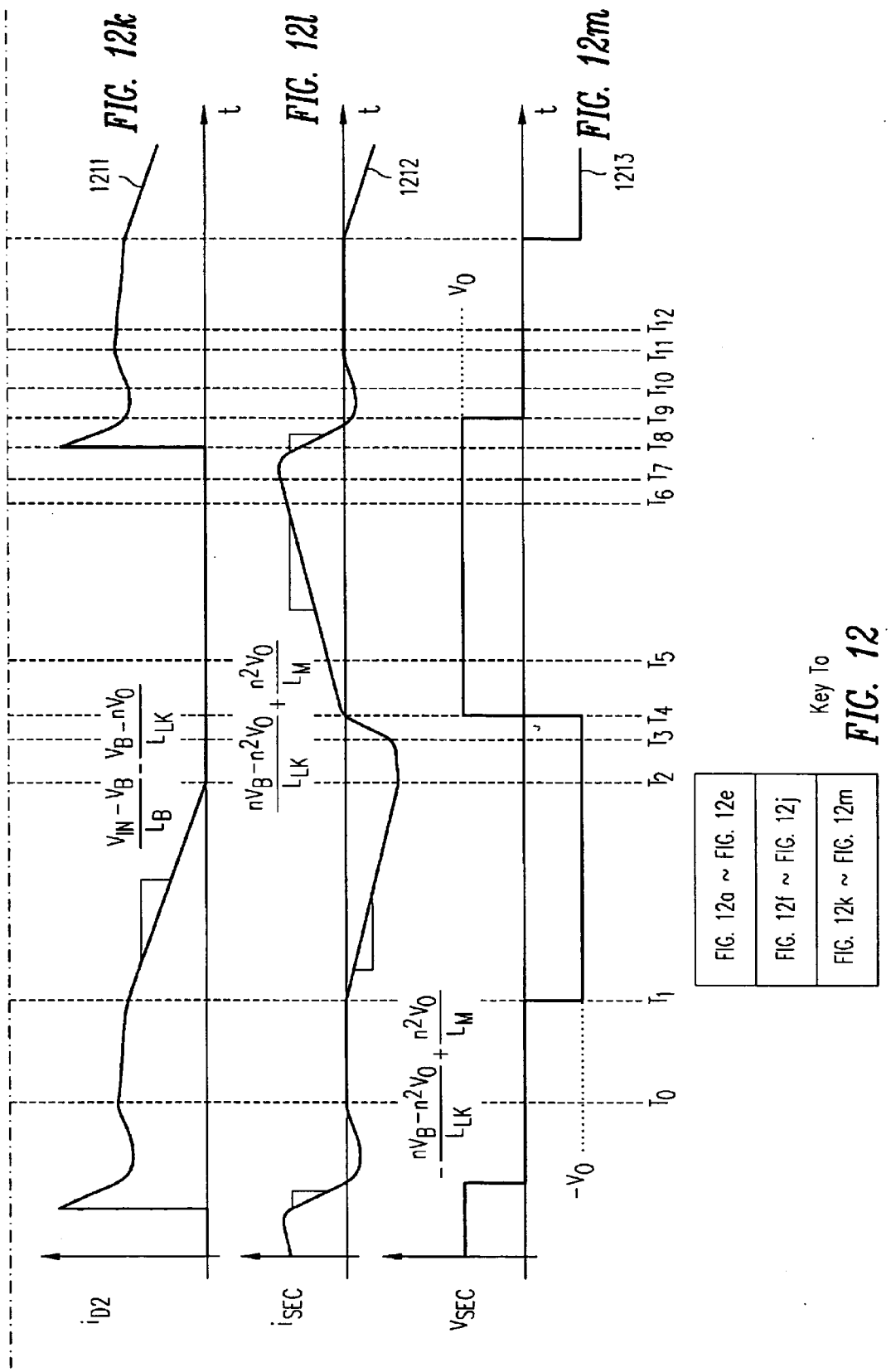

STRUCTURE AND METHOD FOR AN ISOLATED BOOST CONVERTER

BACKGROUND OF THE INVENTION

1. Field of the Invention

The present invention relates to power converters (e.g., boost converters). In particular, the present invention relates to isolated power converters, such as boost converters.

2. Discussion of the Related Art

Boost converter topologies have been extensively used in various AC/DC and DC/DC power conversion applications. In fact, virtually all the front ends of today's AC/DC power supplies that include a power-factor correction (PFC) feature are implemented using a boost converter topology. Boost converter topologies are also used in numerous applications where a relatively low battery-powered input voltage is used to generate a high output voltage. The vast majority of conventional power converters that use a boost topology are non-isolated. However, in some applications, boost converters with galvanically-isolated input and output are required.

Isolated boost converter having one or more isolation transformers are known and studied. Typically, an isolated boost converter may have one or more switches and one or more boost inductors. For example, FIG. 1 shows a current-fed push-pull converter 100, which was disclosed in U.S. Pat. No. 3,938,024 to P. W. Clarke, entitled "Converter Regulation by Controlled Conduction Overlap," and issued on Feb. 10, 1976. As shown in FIG. 1, push-pull converter 100 includes an isolated boost converter with boost inductor 101 and switches 102a and 102b. As another example, FIG. 2 shows isolated boost converter 200, which was disclosed in the article "A Current-Sourced Dc—Dc Converter Derived via the Duality Principle from the Half-Bridge Converter" by P. J. Wolfs, *IEEE Trans. Industrial Electronics*, vol. 40, pp. 139–144, February 1993, uses boost inductors 101a and 101b, and switches 102a and 102b.

Isolated boost converter 200 has a simpler transformer design than single-inductor boost converter 100, in that primary winding 204 and secondary winding 205 in transformer 203 each require only a single winding. By contrast, single-inductor boost converter 100 requires tapped primary and secondary windings 104 and 105 (i.e., essentially two windings each in the primary and secondary windings). In addition, the voltage stress on each of switches 102a and 102b in isolated boost converter 200 is one-half the voltage stress on each of switches 102a and 102b of single-inductor isolated boost converter 100. In particular, the voltage stress on each of primary switches 102a and 102b of isolated boost converter 200 equals the reflected output voltage to primary winding 204, whereas the voltage stress on each primary switch 102a and 102b in isolated boost converter 100 equals twice the reflected output voltage. In either isolated boost converters, however, an increased voltage stress on the primary switches results from ringing between the parasitic leakage inductance of the transformer and the output capacitance of the primary switch (i.e., primary switch 102a or 102b) that is being turned off.

FIG. 3 shows isolated boost converter 300, which does not suffer from the increased voltage stress on the primary switches discussed above. Isolated boost converter 300 was disclosed in the article "New Single-stage PFC Regulator Using Sheppard-Taylor Topology," by C. K. Tse and M. H. L. Chow, *IEEE Trans. Power Electronics*, vol. 13, pp. 842–851, September 1998. In isolated boost converter 300, the maximum voltage stress on each of primary switches 102a and 102b—which are turned on and off simultaneously—is clamped to the voltage of energy-storage capacitor 306 by clamp rectifiers 307a and 307b. However, isolated converter 300 suffers from severe parasitic ringing across the primary winding 204 of transformer 203 due to the parasitic resonance in the leakage inductance of transformer 203 and the junction capacitance of rectifier 308. The parasitic resonance degrades the performance isolation boost converter 300.

SUMMARY OF THE INVENTION

The present invention provides a method and an isolated boost converter that exhibit substantially ringing-free waveforms across all semiconductor devices on both the primary side and the secondary side of a transformer. These ringing-free waveforms in the presence of the transformer's leakage inductance are achieved by (a) clamping the voltages of the primary switches and the rectifier or rectifiers to the voltage of the primary-side energy-storage capacitor, and (b) using a capacitive filter that directly connects the rectifier output to the load to clamp the voltage across a secondary-side rectifier to the output voltage.

In a first embodiment of the present invention, an isolated boost converter includes a single boost inductor, two primary switches, primary-side clamping rectifiers, a primary-side energy-storage capacitor, an isolation transformer, a secondary-side rectifier, and a capacitive filter. The primary switches are turned on and off (i.e., conducting and non-conducting, respectively) simultaneously by a control circuit. When the switches are closed (i.e., rendered conducting), the energy stored in the boost inductor increases, while the energy stored in the primary-side energy-storage capacitor supplies the load. When the primary switches are open (i.e., rendered non-conducting), the input terminals are decoupled from the output terminals, and the energy stored in the boost inductor is transferred to the primary-side energy-storage capacitor. During this time (i.e., when the primary switches are open), the output filter capacitor supplies the load current.

According to a second embodiment of the present invention, an isolated boost converter includes three primary switches, two of which are simultaneously closed and opened, while the third switch is closed and opened before the opening and closing of the other two primary switches. Under this arrangement, the current stress on the secondary side components is substantially reduced because energy is transferred from the input to the output for a longer time than the first embodiment that has only the two primary switches. Specifically, in this second embodiment, the input-to-output energy transfer takes place when the third switch is closed, as well as during the subsequent period when the other two primary switches are closed.

Other embodiments of the present invention can be provided in numerous ways. Specifically, the secondary-side can be implemented either with a full-wave rectifier or a half-wave rectifier. In addition, in AC/DC applications, such as power-factor correction (PFC) applications, the isolated boost converters of this invention can be implemented without an input rectifier.

The present invention is better understood upon consideration of the detailed description below in conjunction with the accompanying drawings.

BRIEF DESCRIPTION OF THE DRAWINGS

FIGS. 6(a)–6(h) are topological stages illustrating the operations of isolated boost convertor 400 of FIG. 4 during a switching cycle, using circuit model 500.

FIGS. 7(a)–7(l) show waveforms of key signals in isolated boost converter 400 during the switching cycle of FIGS. 6(a)–6(h).

FIG. 8 shows key waveforms of converter 400 in FIG. 4, under discontinuous boost inductor current operation.

FIGS. 11(a)–11(l) are topological stages illustrating the operations of isolated boost converter 900 of FIG. 9 during a switching cycle, using circuit model 1000.

FIGS. 12(a)–(m) show key waveforms of signals of converter 900 of FIG. 9.

For clarity and for simplification of the detailed description below, like elements in the figures are provided like reference numerals.

DETAILED DESCRIPTION OF THE INVENTION

Figure 1:
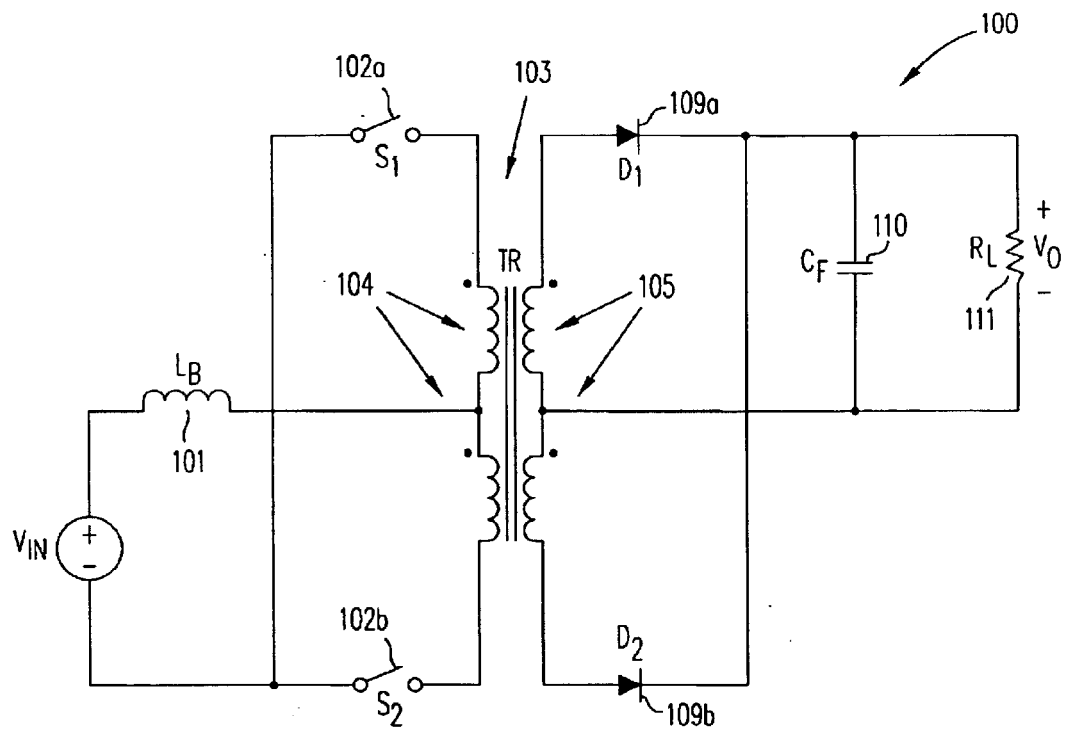
FIG. 1 shows current-fed push-pull DC/DC converter 100 in the prior art.
Figure 2:
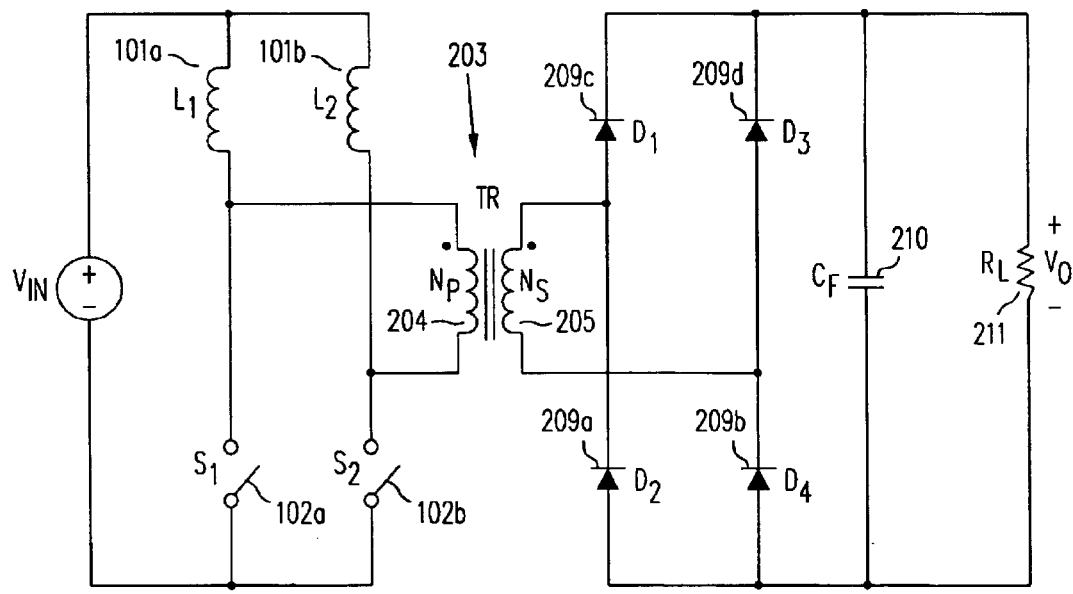
FIG. 2 shows two-inductor isolated boost converter 200 in the prior art.
Figure 3:
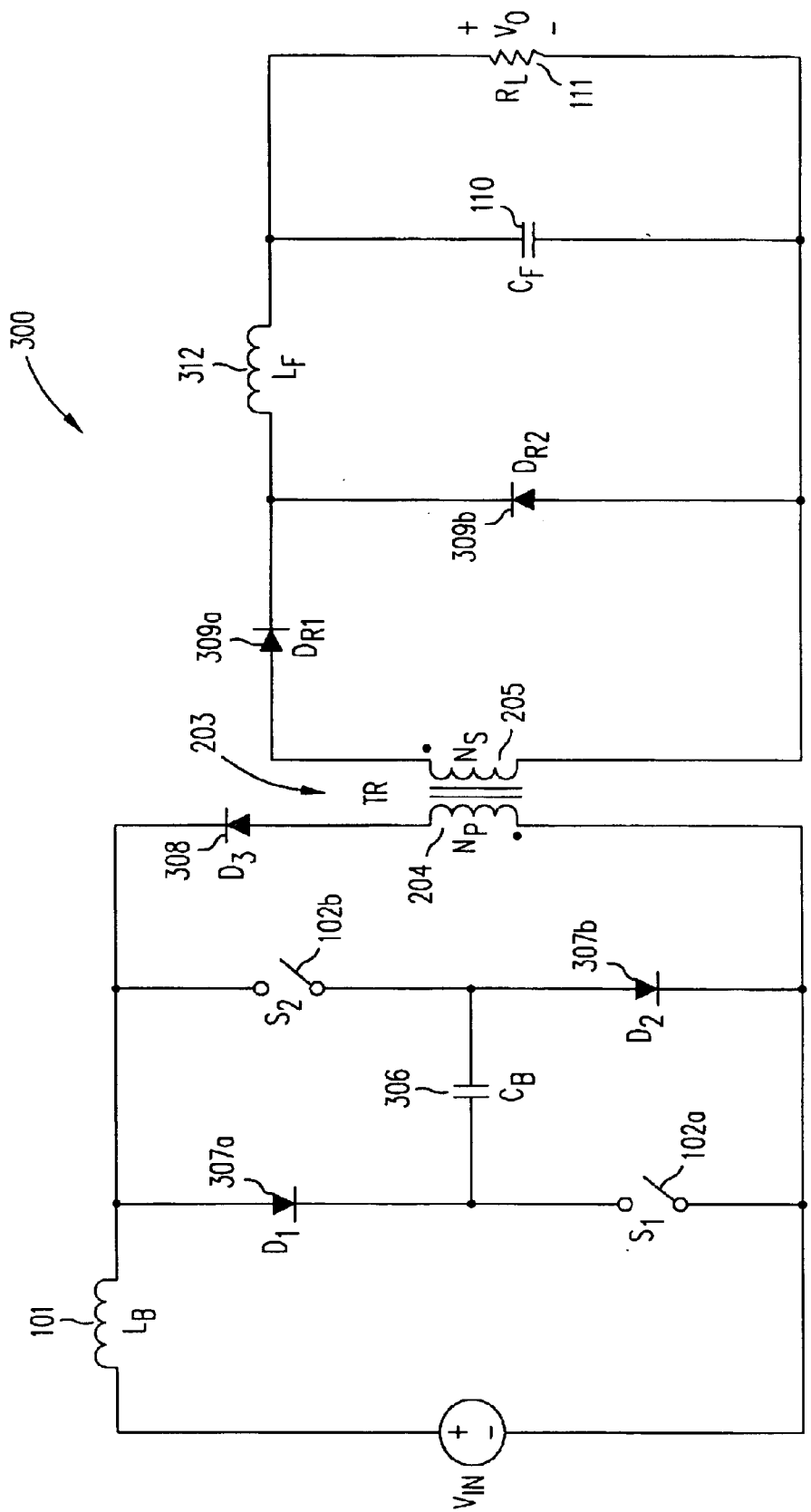
FIG. 3 shows isolated boost converter 300 in the prior art.
Figure 4:
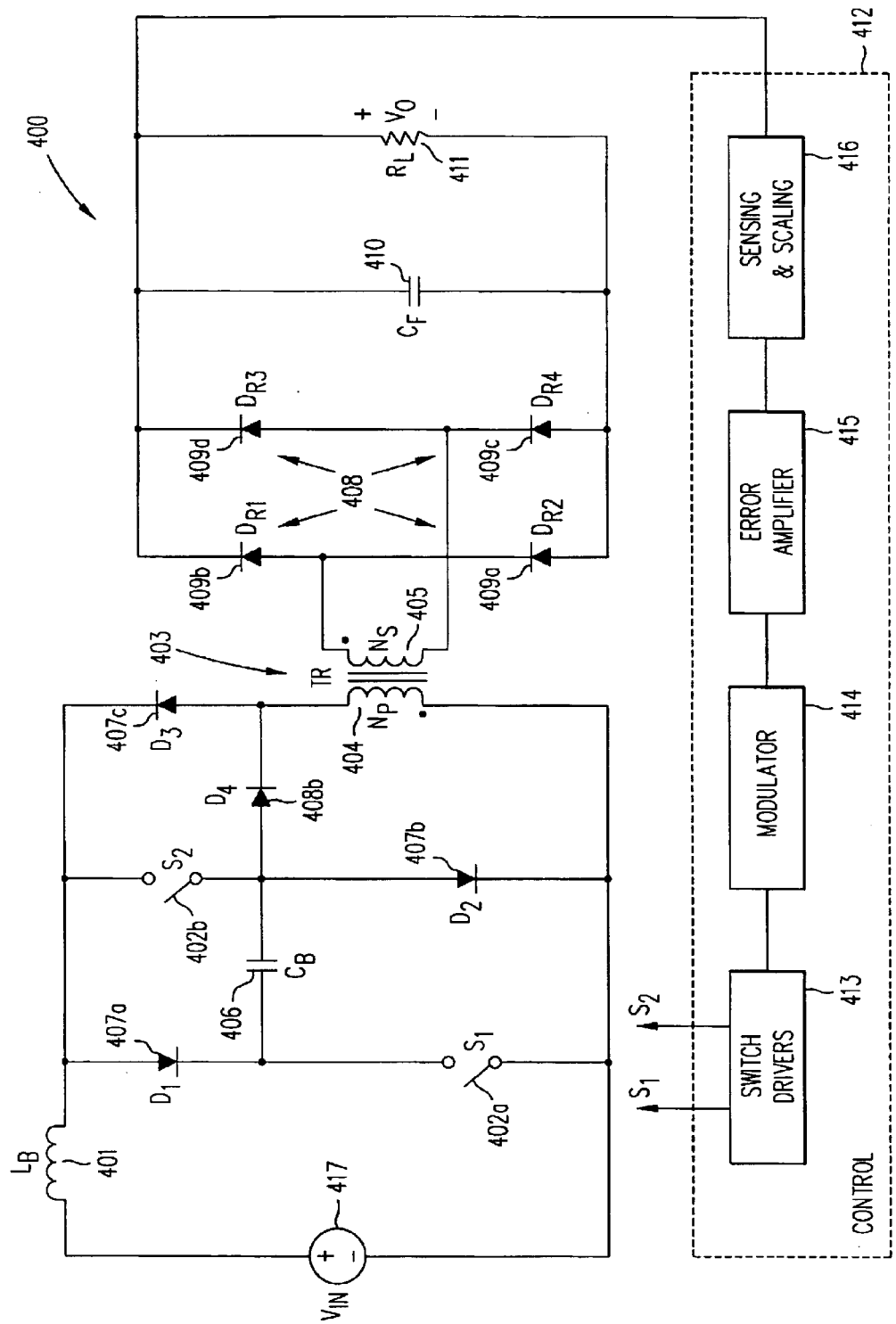
FIG. 4 shows isolated boost converter 400, in accordance to a first embodiment of the present invention.

FIG. 4 shows a first embodiment of the present invention in isolated boost converter 400. As shown in FIG. 4, on the input side, isolated boost converter 400 includes voltage source 417 at voltage $V_{IN}$, boost inductor 401 with an inductance value $L_B$, switches 402a and 402b (controlled respectively by signals $S_1$ and $S_2$), primary-side energy-storage capacitor 406 with a capacitance value $C_B$, rectifiers 407a, 407b and 407c ($D_1$ through $D_3$), and primary winding 404 of transformer 403 (TR). On the output side, isolated boost converter 400 includes the secondary winding 405 of transformer 403, which is connected to the full-bridge rectifier 408 implemented with rectifiers 409a-409d ($D_{R1}$ through $D_{R4}$), and filter capacitor 410 with capacitance value $C_F$ connected across load 411 (resistance value $R_L$).

Figure 5:
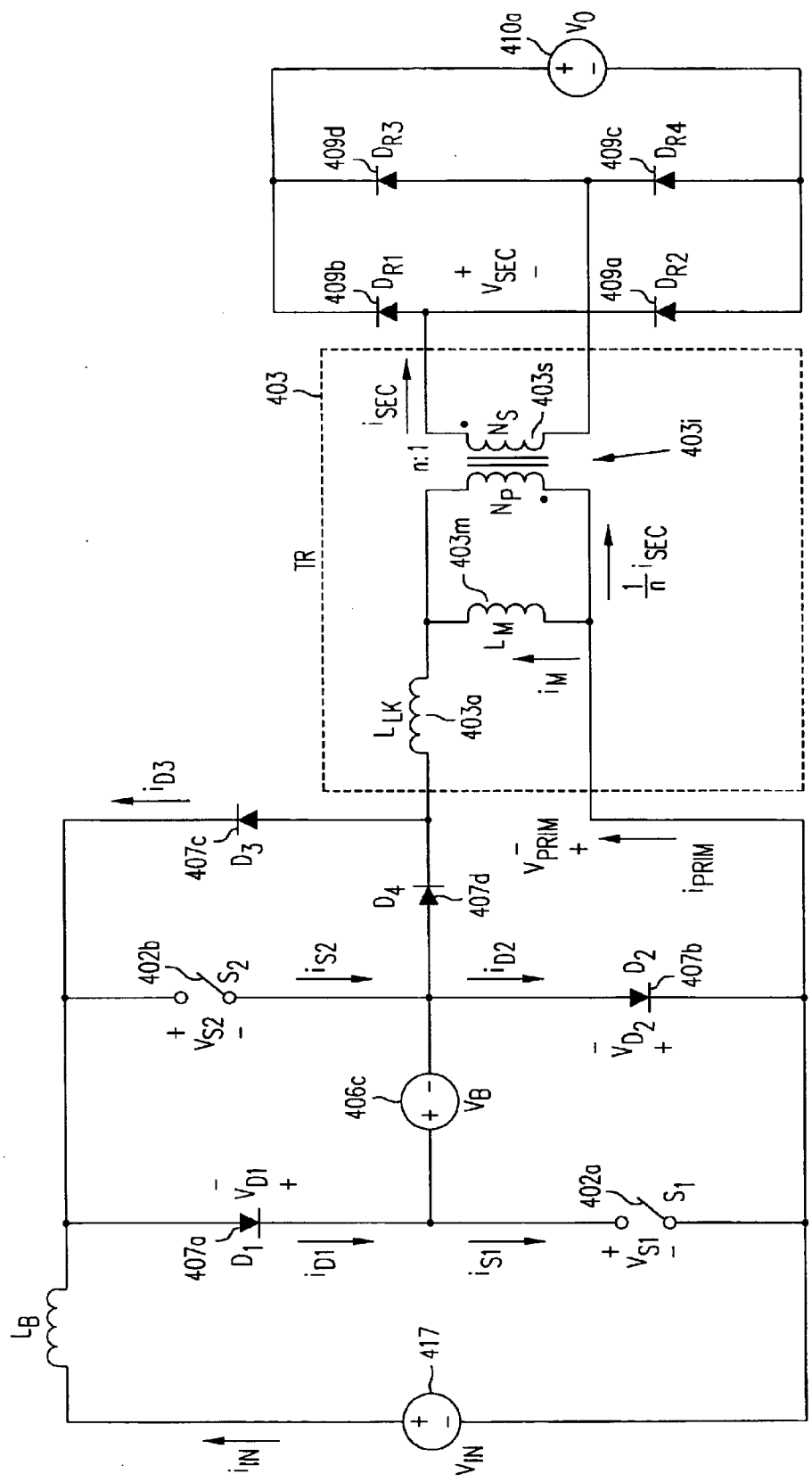
FIG. 5 shows simplified circuit model 500 of isolated boost converter 400 of FIG. 4.

To illustrate the operation of isolated boost converter 400, FIG. 5 provides simplified circuit model 500 of isolated boost converter 400 of FIG. 4. In simplified circuit model 500, energy-storage capacitor 406 and filter capacitor 410 are modeled by voltage sources 406a ($V_B$) and 410a ($V_O$), respectively, since capacitance value $C_F$ of filter capacitor 410 is large enough, so that the voltage ripples ($V_r$) across capacitors 410 and 406 are small relative to their DC voltages. In addition, in FIG. 5, isolation boost transformer 403 is modeled by leakage inductor 403a (inductance value $L_{LK}$), magnetizing inductor 403m (inductance value $L_M$), and ideal transformer 403i with a turns ratio $n=N_P/N_S$, where $N_P$ is the number of turns in the primary winding and $N_S$ is the number of turns in the secondary winding. In circuit model 500, all semiconductor components are assumed to have no impedance, when conducting, and infinite impedance, when not conducting.

FIGS. 6(a)–6(h) are topological stages showing the operation of isolated boost conductor 400 of FIG. 4 during a switching cycle, illustrated using circuit model 500. FIGS. 7(a)–7(l) show waveforms of key signals in isolated boost converter 400 during the switching cycle of FIGS. 6(a)–6(h). In the operation of FIGS. 6(a)–6(h), the inductance value LB of boost inductor 401 is assumed to be large enough, so that input current $i_{IN}$ does not flow to zero during the switching cycle. The reference directions of currents and voltages in FIGS. 7(a)–7(l) are indicated in FIG. 5.

As illustrated by waveform 701 of FIG. 7(a), control signals $S_1$ and $S_2$, controlling primary switches 402a and 402b, respectively, are simultaneously switched to render switches 402a and 402b to be in "on" and "off" states. The duty cycle D of isolated boost converter 400 is defined by the relative times of signals $S_1$ and $S_2$ in the "on" and "off" states of switches 402a and 402b.

When switches 402a and 402b are open (e.g., during time interval $T_0$ and $T_1$), input current $i_{IN}$ flows in diodes 407a and 407b, as shown in FIG. 6(a). Assuming that transformer 403 is in completely reset state at time To (i.e., magnetizing current $i_M$ is zero), no other current flows in isolated boost converter 400 between times $T_0$ and $T_1$, at which time switches 402a and 402b are switched to conducting states by signals $S_1$ and $S_2$. Because voltage $V_B$ across capacitor 406 is greater than voltage $V_{IN}$ during time interval $[T_0, T_1]$, input current $i_{IN}$ decreases with a substantially constant slope, as illustrated by waveform 705 of FIG. 7(e). As a result, diode currents $i_{D1}$ and $i_{D2}$ (waveforms 709 and 710 of FIG. 7) in rectifiers 407a and 407b each also decrease at the same rate as input current $I_{IN}$ (waveform 705 of FIG. 7(e)):

$$\frac{di_{D1}}{dt} = \frac{di_{D2}}{dt} = \frac{di_{IN}}{dt} = \frac{V_{IN} - V_B}{L_B} < 0 \qquad (1)$$

Figure 6B:
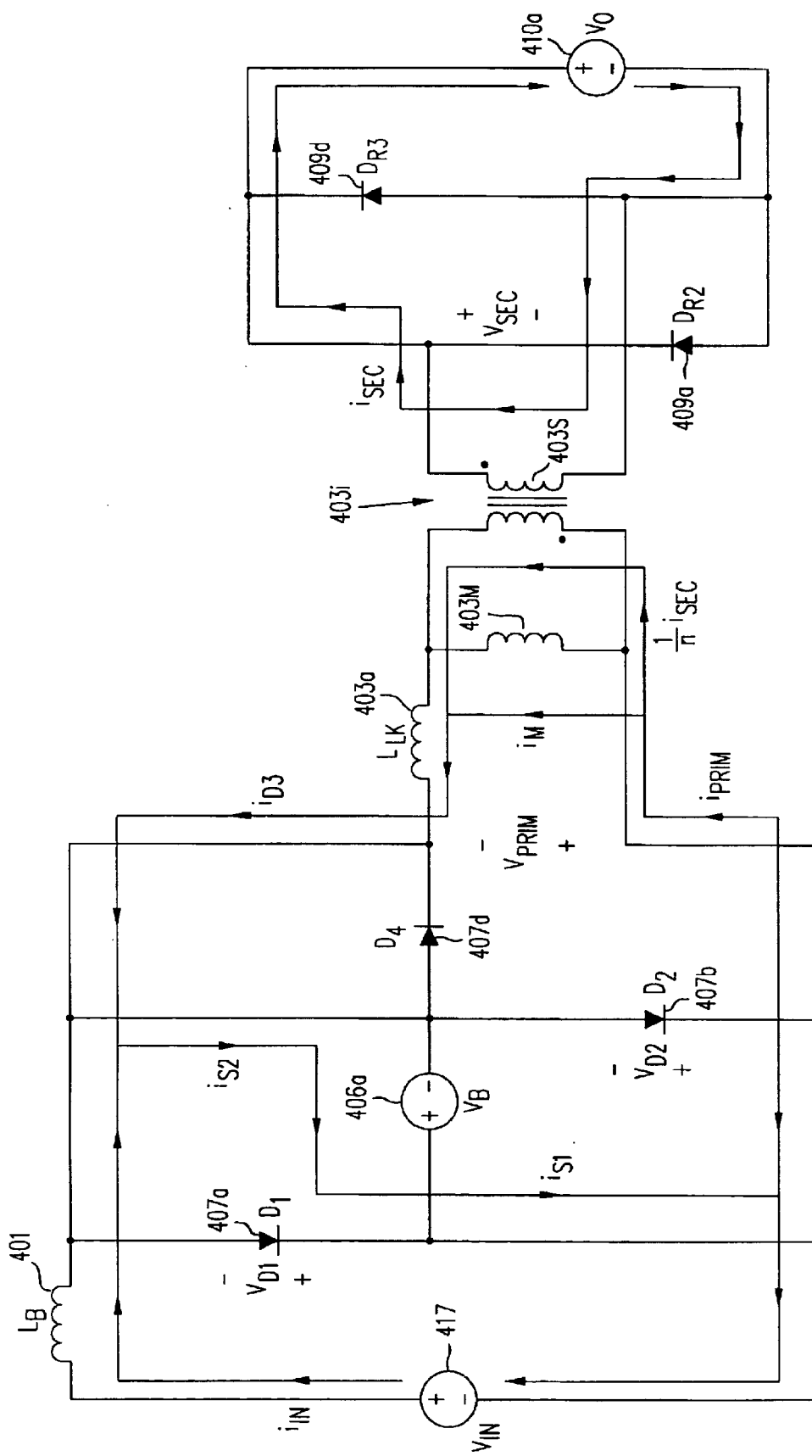

At time $T_1$, when switches 402a and 402b both close, input current $i_{IN}$ is diverted from diodes 407a and 407b to flow in switches 402a and 402b, as illustrated in FIG. 6(b). At the same time, primary current $i_{PRIM}$ (waveform 706 of FIG. 7(f)) and secondary current $i_{SEC}$ (waveform 711 of FIG. 7(k)) begin to flow because, after switches $S_1$ and $S_2$ close, voltage source 406a (which models energy storage capacitor 406, at voltage $V_B$) appears in parallel with primary winding 404 of transformer 403, so that voltages $V_{PRIM}$ across primary winding 404 of transformer 403 equals voltage $V_B$ across capacitor 406. As secondary voltage $V_{SEC}$ (waveform 712, FIG. 7(l)) across secondary winding 405 of transformer 403 is positive during time interval $[T_1–T_2]$, secondary current $i_{SEC}$ (waveform 711, FIG. 7(k)) flows in rectifiers 409b ($D_{R1}$) and 409c ($D_{R4}$). As shown in FIG. 6(b), during the [$T_1$-$T_2$] interval, secondary current $i_{SEC}$ is given by:

$$i_{SEC} = n \cdot [i_{PRIM} - i_M] \quad (2)$$

In this model, primary current $i_{PRIM}$ (waveform 706, FIG. 7(f)) and magnetizing current $i_M$ (waveform 707, FIG. 7(g)) are given, respectively, by:

$$i_{PRIM} = \frac{V_B - nV_O}{L_{LK}} \cdot t \quad (3)$$

$$i_M = \frac{nV_O}{L_M} \cdot t \quad (4)$$

Thus, substituting the relevant expressions from equations (3) and (4) into equation (2), secondary current $i_{SEC}$ is given by:

$$i_{SEC} = n \cdot \left[ \frac{V_B - nV_O}{L_{LK}} - \frac{nV_O}{L_M} \right] \cdot t \quad (5)$$

Therefore, during time interval [$T_1$, $T_2$], primary current $i_{PRIM}$, magnetizing current $i_M$, and secondary current $i_{SEC}$ each increase linearly from zero value, beginning at time $T_1$, as illustrated by waveforms 706, 707 and 711 FIGS. 7(f), (g), and (k), respectively. In addition, during this time interval (i.e., time interval [$T_1$, $T_2$]), input current $i_N$ (waveform 705, FIG. 7(e)) also increases with a slope $di_{IN}/dt$ given by:

$$\frac{di_{IN}}{dt} = \frac{V_{IN} + V_B}{L_B} \quad (6)$$

Figure 6D:
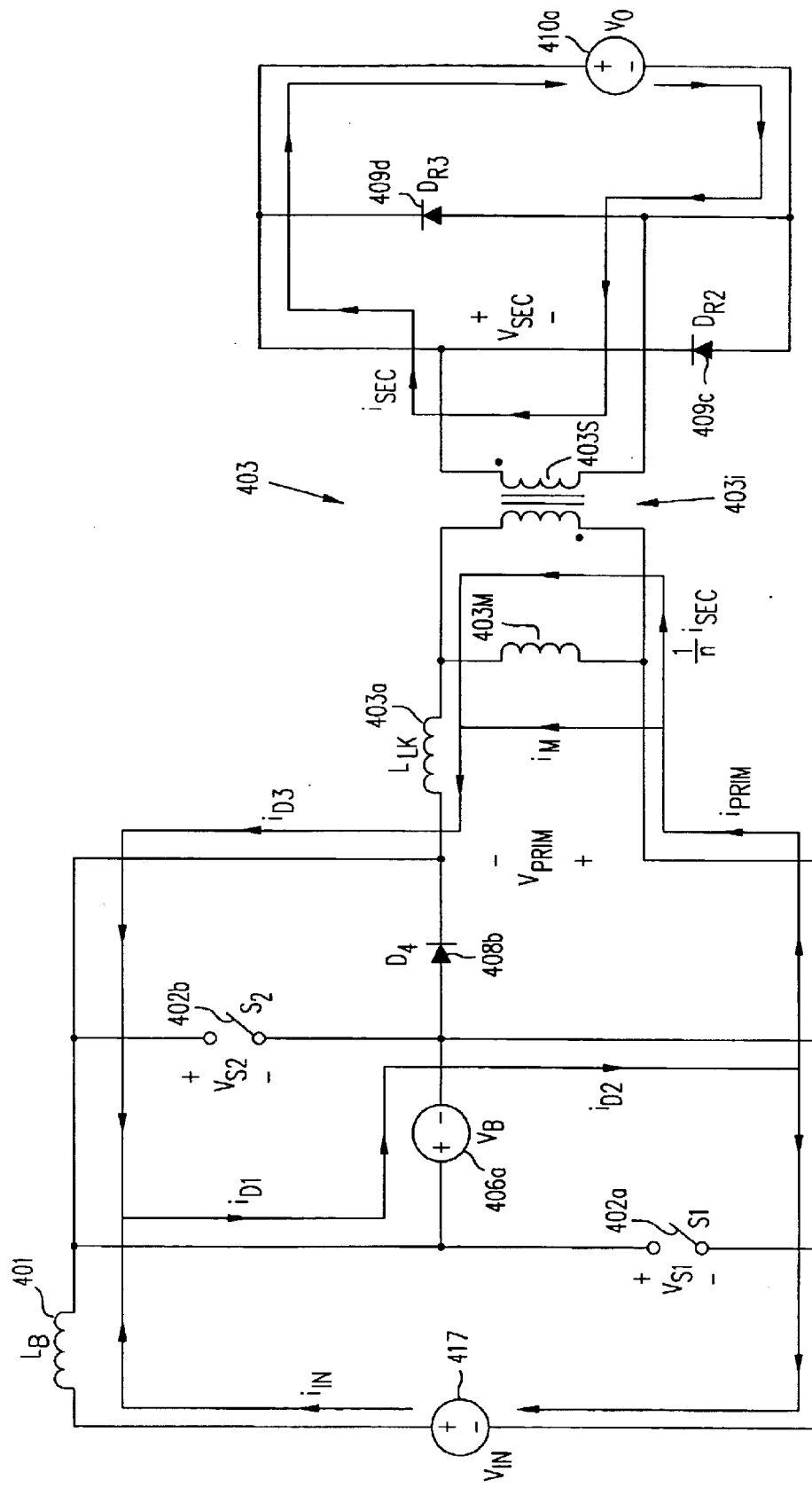

At time $T_2$, as shown in FIG. 7(a), signals $S_1$ and $S_2$ open switches 402a and 402b simultaneously, so that the current flowing through switches 402a and 402b begins to charge output capacitors 413a (with capacitance $C_{OSS1}$) and 413b (with capacitance $C_{OSS2}$) of switches 402a and 402b, as illustrated by the circuit model of FIG. 6(c). During time interval [$T_2$, $T_3$], voltages $V_{S1}$ and $V_{S2}$ (each illustrated by waveform 702 of FIG. 7(b)) across switches 402a and 402b, respectively, increase toward voltage $V_B$ across capacitor 406. At the same time, voltages $V_{D1}$ and $V_{D2}$ across diodes 407a and 407b decrease toward zero at the same rate, as illustrated by waveforms 702 and 703 in FIGS. 7(b) and (c). Due to the decreasing primary voltage $V_{PRIM}$ across the primary windings 404 of transformer 403, the rate of rise in primary current $i_{PRIM}$ also decreases, to result in a corresponding decrease in the rate of current increase in secondary current $i_{SEC}$. Magnetizing current $i_M$ continues to increase at the same rate it has increased since time $T_1$ because the voltage across magnetizing inductor 403m remains unchanged at $nV_O$. At time $T_3$, output capacitors 413a and 413b of switches 402a and 402b, respectively, are charged to voltage $V_B$, so that diodes 407a and 407b begin to conduct, as illustrated by FIG. 6(d).

After time $T_3$, voltage source 406a is connected in opposite polarity to input voltage source 417, so that input current $i_{IN}$ decreases linearly with the slope given by equation (1). In addition, as primary voltage $V_{PRIM}$ across the primary windings of transformer 403 is negative (i.e., $V_{PRIM} = -V_B$), primary current $i_{PRIM}$ (waveform 706, FIG. 7(f)) also decreases linearly with a slope:

$$\frac{di_{PRIM}}{dt} = -\frac{V_B + nV_O}{L_{LK}} \quad (7)$$

Because both current $i_{IN}$ and current $i_{PRIM}$ decrease linearly, currents $i_{D1}$ and $i_{D2}$ in rectifiers 407a and 407b, respectively, also decrease linearly, as illustrated by waveforms 709 and 710 of FIGS. 7(i) and (j), until time $T_4$, when primary current $i_{PRIM}$ in the primary winding of transformer 403 equals magnetizing current $i_M$. Thus, at time $T_4$, secondary current $i_{SEC}$ in the secondary winding of transformer 403 falls to zero.

Figure 6E:
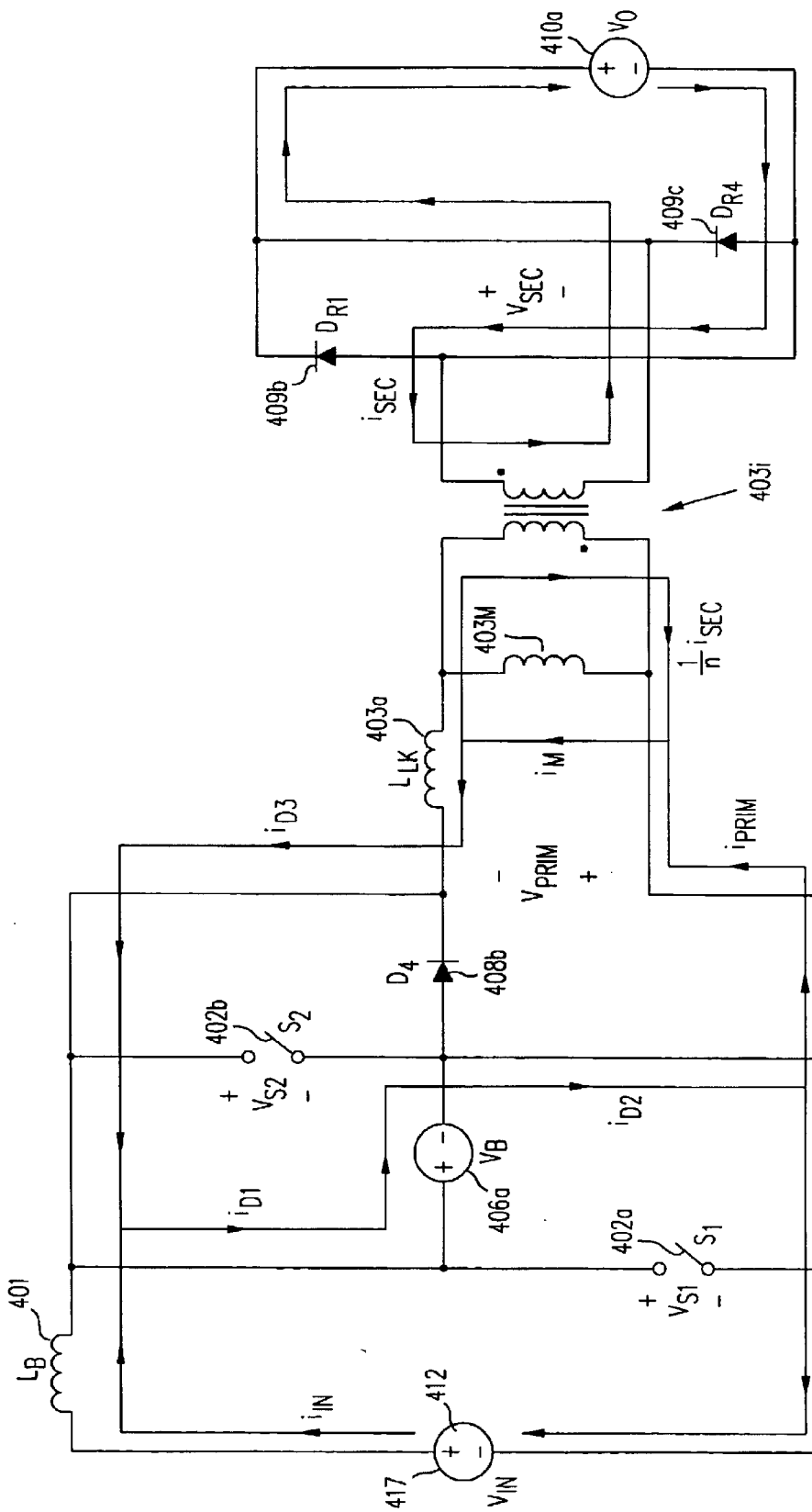

As illustrated by FIG. 6(e), after time $T_4$, secondary current $i_{SEC}$ becomes negative, and rectifiers 409a and 409d (i.e., rectifiers $D_{R2}$ and $D_{R3}$) are conducting. At this time, primary current $I_{PRIM}$ continues to flow through diode 407c (i.e., diode $D_3$). During time interval [$T_4$, $T_5$], as the voltage across the secondary winding of transformer 403 is negative, the rate at which the primary current decreases toward zero is reduced to $$\frac{di_{PRIM}}{dt} = -\frac{V_B - nV_O}{L_{LK}} < 0. \quad (8)$$

Figure 6F:
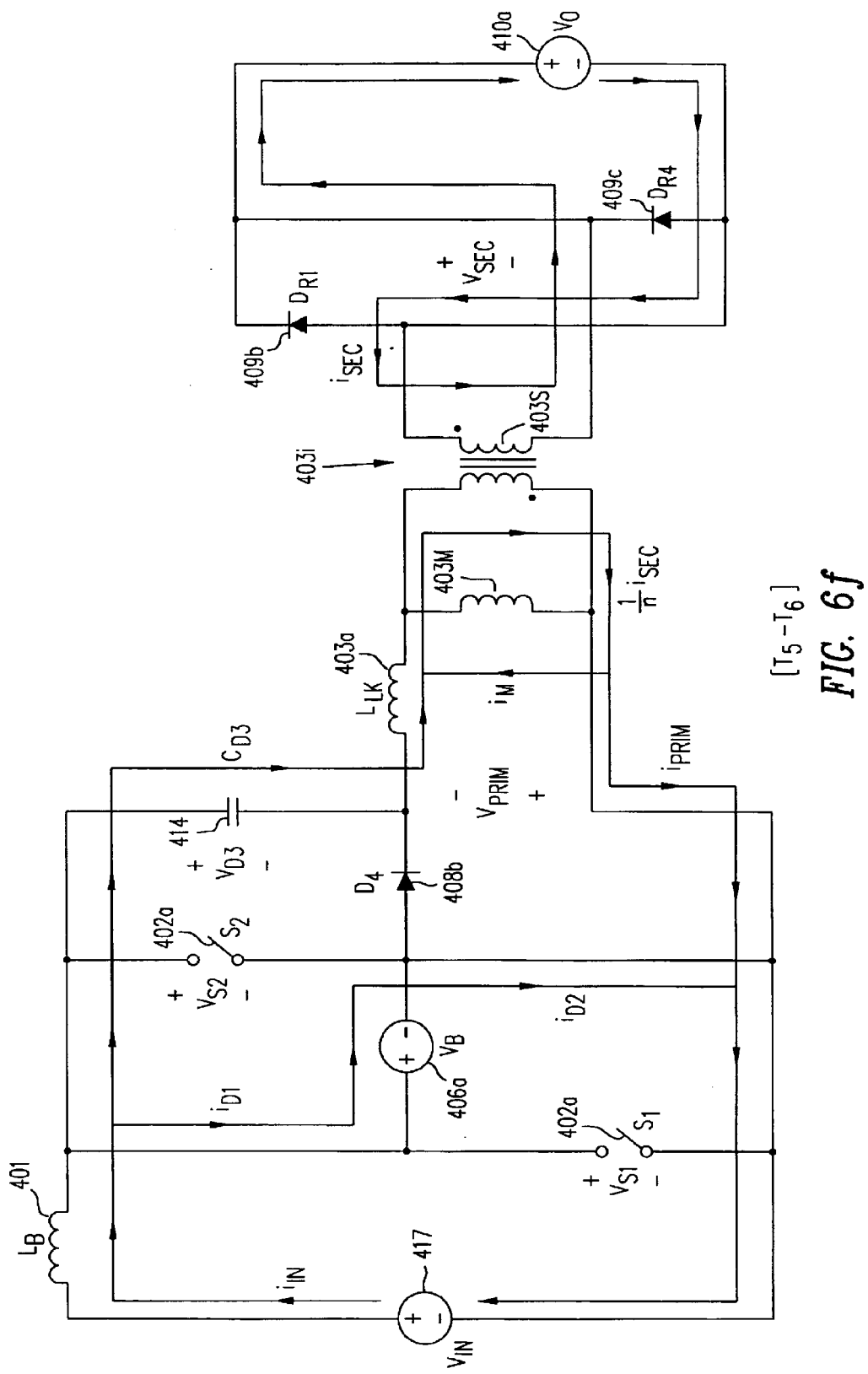
Figure 6G:
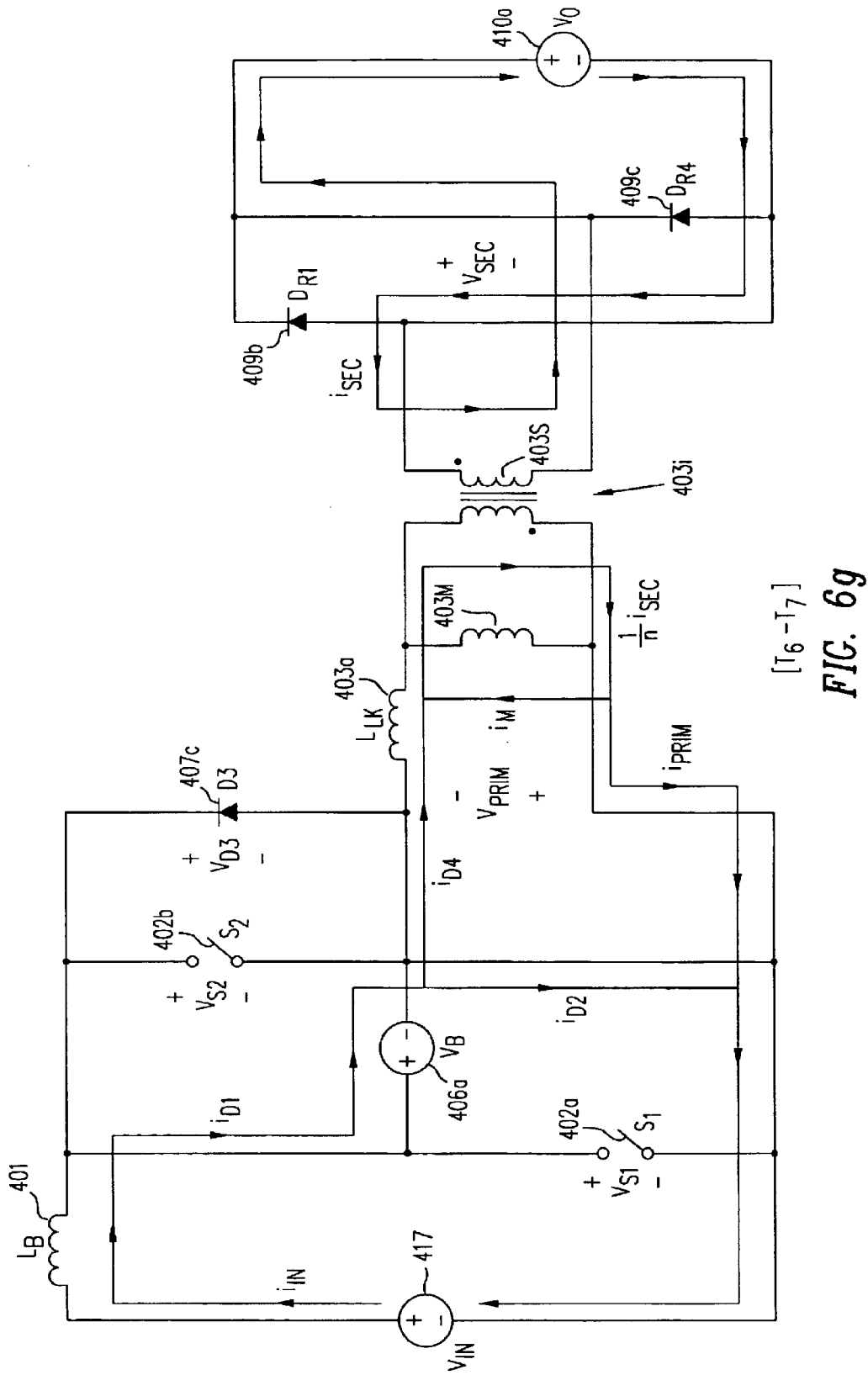

At time $T_5$, when primary current $I_{PRIM}$ falls to zero, diode 407c ceases to conduct, so that diode's junction capacitance $C_{D3}$ starts resonating with leakage inductor 403a (inductance $L_{LK}$), as illustrated in FIG. 6(f). During this time, primary current $I_{PRIM}$ charges junction capacitor 414 (capacitance $C_{D3}$) of rectifier of diode 407c toward $V_B$, as illustrated in FIG. 7(d). The negative peak of primary current $I_{PRIM}$ occurs at time $T_6$, when voltage $V_{D3}$ across rectifier 407c reaches $V_B$, and clamp diode 408b ($D_4$) begins to conduct, thus providing a current path for primary current $i_{PRIM}$, as illustrated in FIG. 6(g). The magnitude of current $I_{PRIM}$'s negative peak is given by:

$$i_{PRIM}^{PK(NEG)} = \frac{V_B - nV_O}{\sqrt{L_{LK}/C_{D3}}} \quad (9)$$

Figure 6H:
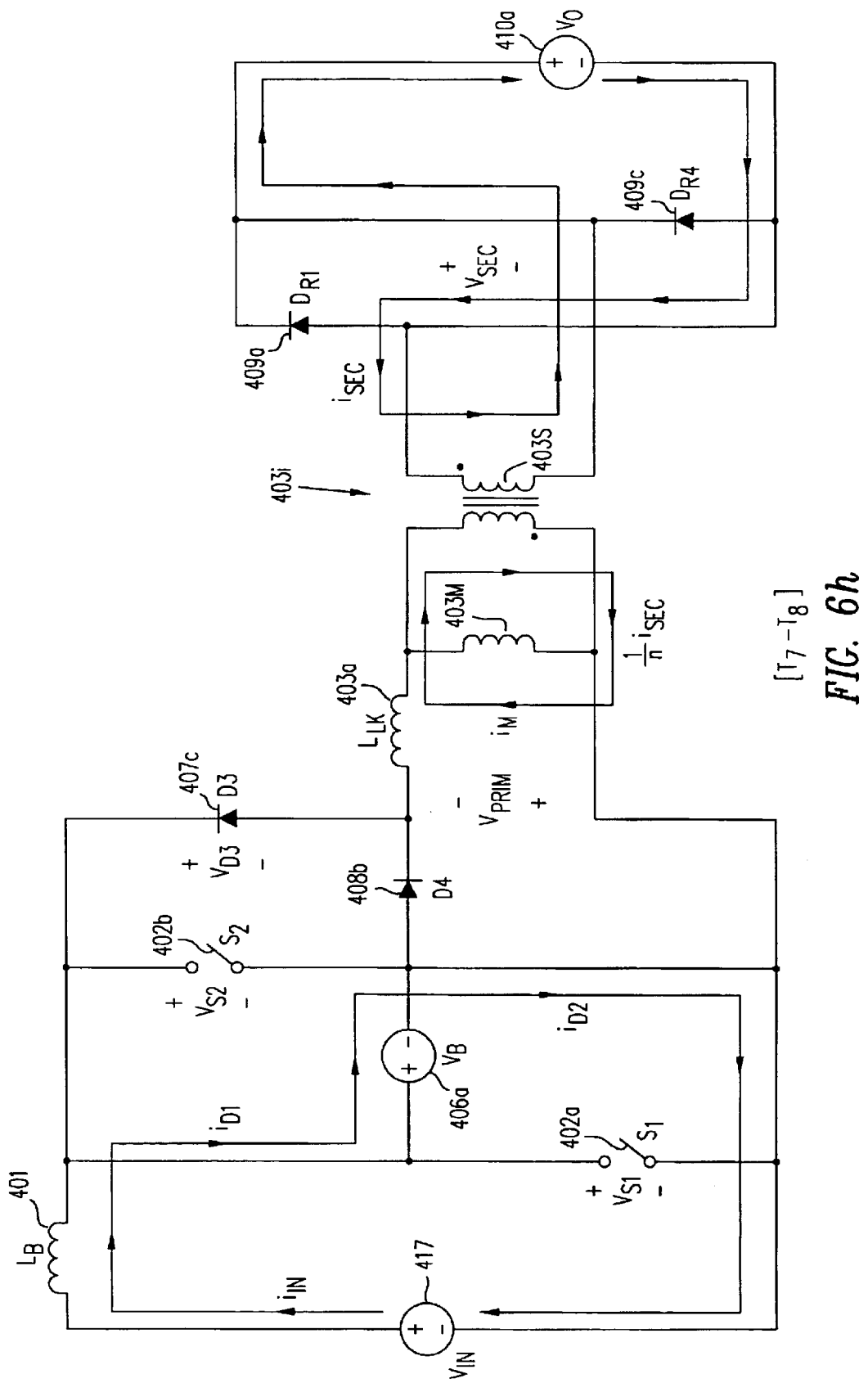

During time interval [$T_6$, $T_7$], primary current $i_{PRIM}$ increases linearly from the peak negative current of equation (9) toward zero, which is reached time $T_7$. At time $T_7$, diode 408b becomes non-conducting, and residual magnetizing current $i_M$ is dissipated through the secondary winding of transformer 403, as illustrated by FIG. 6(h), until time $T_8$; when magnetizing inductor 403m is fully reset, as illustrated by waveform 707 of FIG. 7(g). The next switching cycle is initiated at time $T_9$, when signals $S_1$ and $S_2$ closes switches 402a and 402b.

According to the detailed description of operation presented above, in converter 400 (FIG. 4), the energy stored in primary energy-storage capacitor 406 is transferred to load 411 during time interval [$T_1$, $T_2$], when switches 402a and 402b are both close. In addition, during this time interval, the energy stored in boost inductor 401 is increasing. When signals $S_1$ and $S_2$ open switches 402a and 402b, the energy stored in boost inductor 401 is transferred to primary-side energy-storage capacitor 406, while load current in load 411 is supplied from output filter capacitor 410.

Based on the volt-second balance on boost inductor 401, voltage $V_B$ of energy-storage capacitor 406 relates to input voltage $V_{IN}$ (voltage source 417) by:

$$V_B = \frac{1}{1-2D} \cdot V_{IN}, \qquad (10)$$

where D is the duty cycle of switches 402a and 402b, defined as D=$T_{ON}/T_S$, where $T_{ON}$ is the length of time during which switches 402a and 402b are conducting, and $T_S$ is the length of the switching period of switches 402a and 402b, as illustrated in FIG. 7(a). According to equation (10), duty cycle D of converter 400 is less than or equal to 0.5.

The relationship between output voltage $V_O$ across load 411 and voltage $V_B$ at energy storage capacitor 406 is derived by recognizing that load current $I_O$ in load 411 equals the average rectified secondary current <$|i_{SEC}|$>. That is, $$V_O = R_L I_O = R_L < |i_{SEC}| > \qquad (11)$$

where $R_L$ is the resistance of load 411.

Neglecting magnetizing current $i_M$ by assuming that magnetizing inductance $L_M$ of magnetizing inductor 403m is very (infinitely) large, and by assuming that time interval [$T_2$, $T_4$] is much shorter than "on" time $T_{ON}$ of switches 402a and 402b, the average secondary current is given by $$I_O = \langle |i_{SEC}| \rangle = \frac{n^2 D^2}{2 L_{LK} f_S} \cdot \left[ \frac{V_B}{n} - V_O \right] \qquad (12)$$

where $f_S = 1/T_S$ is the switching frequency.

From equations (10)–(12), the approximate voltage conversion ratio of the circuit in FIG. 4 can be calculated as $$\frac{nV_O}{V_{IN}} \approx \frac{1}{1-2D} - \frac{2}{nD^2} \cdot \frac{I_O L_{LK} f_S}{nV_{IN}} = \frac{1}{1-2D} - \frac{2}{nD^2} I_{ON} \qquad (13)$$

where $$I_{ON} = \frac{I_O L_{LK} f_S}{nV_{IN}} \qquad (14)$$

is the normalized output current. The expression for the voltage conversion ratio in equation (13) is valid for $$0 < D < 0.5 \qquad (15)$$

and $$I_{ON} \leq \frac{nD^3}{1-2D} \qquad (16)$$

since $nV_O/V_{IN} \geq 1$

Equation (13) shows that the voltage conversion ratio depends not only on duty cycle D of switches 402a and 403b, and turns ratio n of transformer 403, but also on load current $I_O$ in load 411, as well as switching frequency $f_S$ of switches 402a and 402b and leakage inductance $L_{LK}$ of transformer 403.

In the operations described above, input current $i_{IN}$ in boost inductor 401 does not decrease to zero during the "off" period when switches 402a and 402b are not conducting. However, converter 400 can operate in a mode where input current in boost conductor can fall to zero (i.e., "discontinuous boost inductor current") during the "off" period, as illustrated by FIGS. 8(a)–8(l). Under discontinuous boost inductor current operation, when input current $i_{IN}$ becomes zero at time $T_9$, rectifiers 407a and 407b cease conducting and the reverse voltages in rectifiers 407a and 407b (i.e., $V_{D1}$ and $V_{D2}$) for the remainder of the switching period are each 0.5 ($V_B - V_{IN}$), as illustrated in FIGS. 8(c) and 8(e), respectively. In addition, during time interval [$T_9$, $T_{10}$], the voltages $V_{S1}$ and $V_{S2}$ across primary switches 402a and 402b each equal 0.5 ($V_B + V_{IN}$), and voltage $V_{D3}$ of rectifier 407c equals $V_{IN}$.

In converter 400 of FIG. 4, substantial secondary current $i_{SEC}$ flows in the secondary winding of transformer 400 when switches 402a and 402b are conducting, and, during a portion of the "off" period of switches 402a and 402b, a relatively small magnetizing current $i_m$ of magnetizing inductor 403m flows through the secondary winding of transformer 403 until the magnetizing inductance of magnetizing inductor 403m is reset. Because of the short duration of the secondary current flow (i.e., less than $T_S/2$), as well as its triangular current waveform, a current stress exists in the secondary side of converter 400. Providing an auxiliary switch 901 across rectifier 407c, as shown in converter 900 of FIG. 9, can significantly reduce this secondary-side current stress in converter 400. Switch 901 allows secondary current $i_{SEC}$ to flow in both directions, thereby decreasing the peak current through the secondary side of converter 900.

Figure 9:
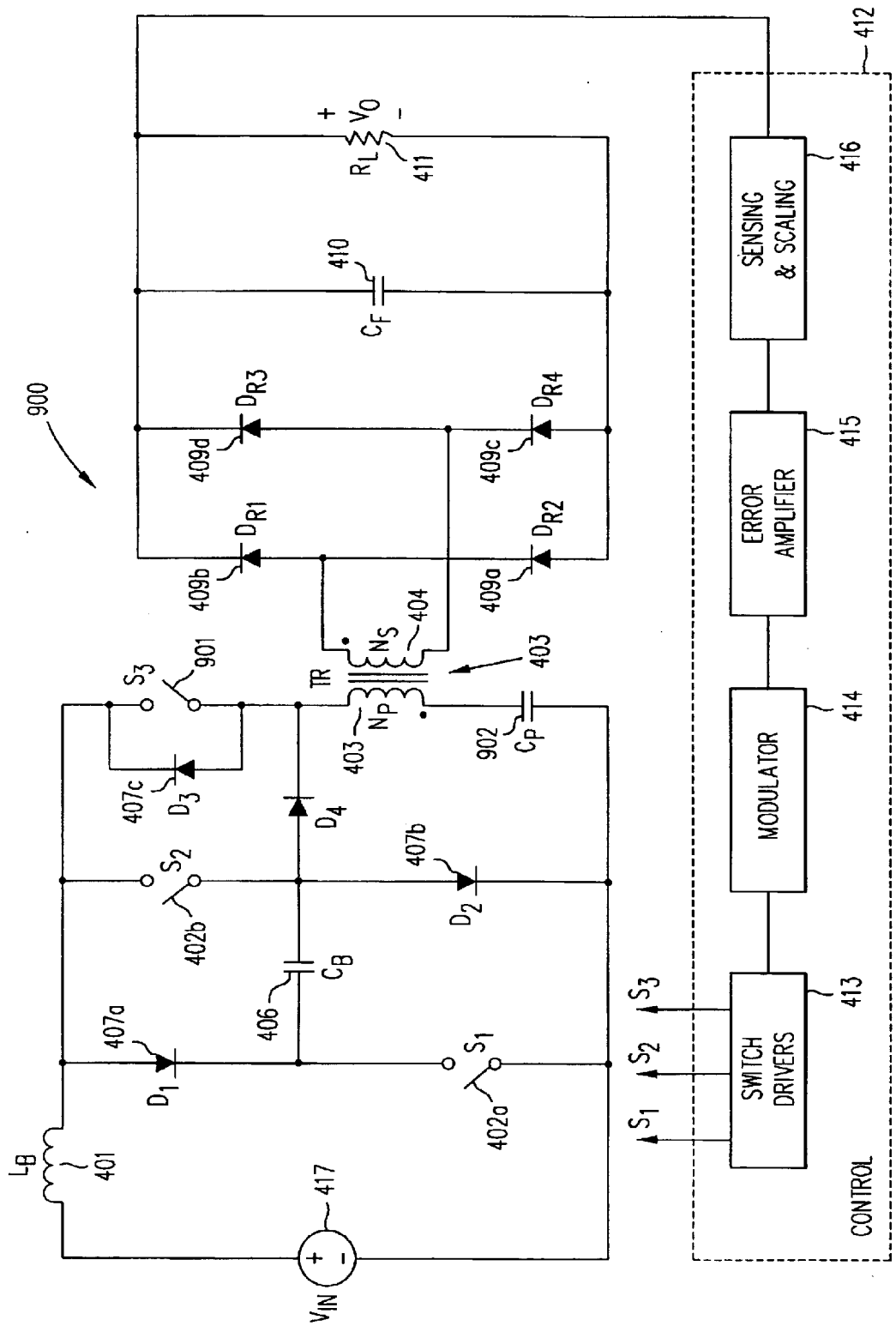
FIG. 9 shows isolated boost converter 900, in accordance with a second embodiment of the present invention.
Figure 10:
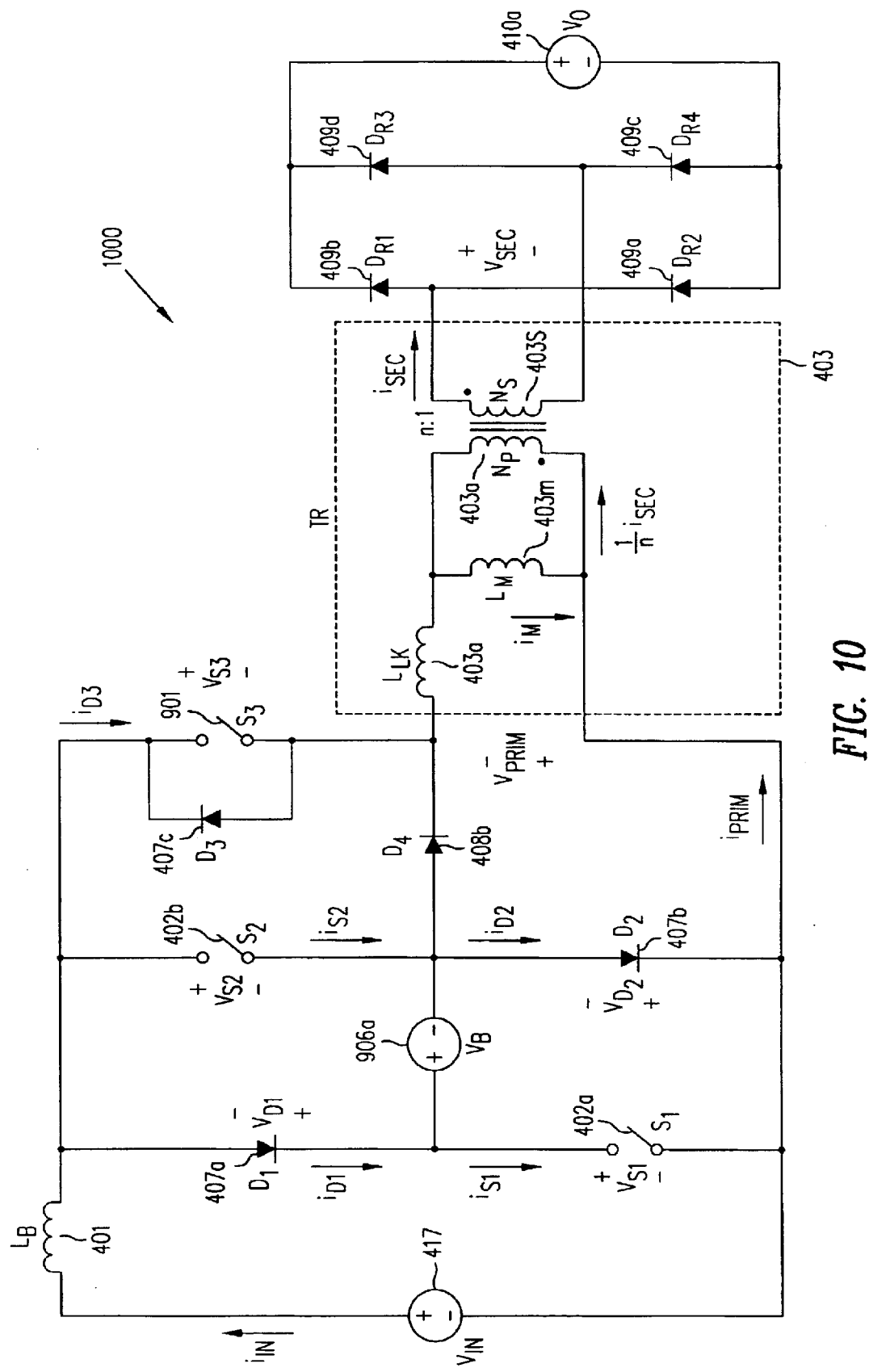
FIG. 10 shows simplified model 1000 of circuit in FIG. 9, showing reference directions of currents and voltages.

To facilitate the explanation of the operations of converter 900 in FIG. 9, FIG. 10 provides simplified circuit model 1000 of converter 900. FIGS. 11(a)–11(l) are topological stages illustrating the operations of isolated boost converter 900 of FIG. 9 during a switching cycle, using circuit model 1000. FIGS. 12(a)–(m) show key waveforms of signals of converter 900 during a switching cycle. The reference directions of currents and voltages used in FIGS. 12(a)–(m) are shown in FIG. 10.

As shown in FIGS. 12(a) and (b), switch 901 is turned on by signal $S_3$ (waveform 1202) substantially before switches 402a and 402b are turned on by signals $S_1$ and $S_2$ (waveform 1201) simultaneously. Switch 901 is turned off before switches 402a and 402b are turned off. For proper operation, i.e., to avoid saturating transformer 403, the time interval between switch 901 becomes conducting and switches 402a and 402b become conducting should be substantially equal to the time during which switches 402a and 402b are conducting. In converter 900, to prevent transformer 403 from saturating due to a timing mismatch in drive signals $S_1$, $S_2$ and $S_3$, capacitor 902 (with a capacitance value $C_P$) is connected in series with primary winding 404 of transformer 404. Since the DC voltage across blocking capacitor 902 is zero for ideally matched drive signals, and relatively small for slightly mismatched drive signals, the voltage across capacitor 902 can be neglected (i.e., assumed zero) in the following analysis.

Figure 11A:
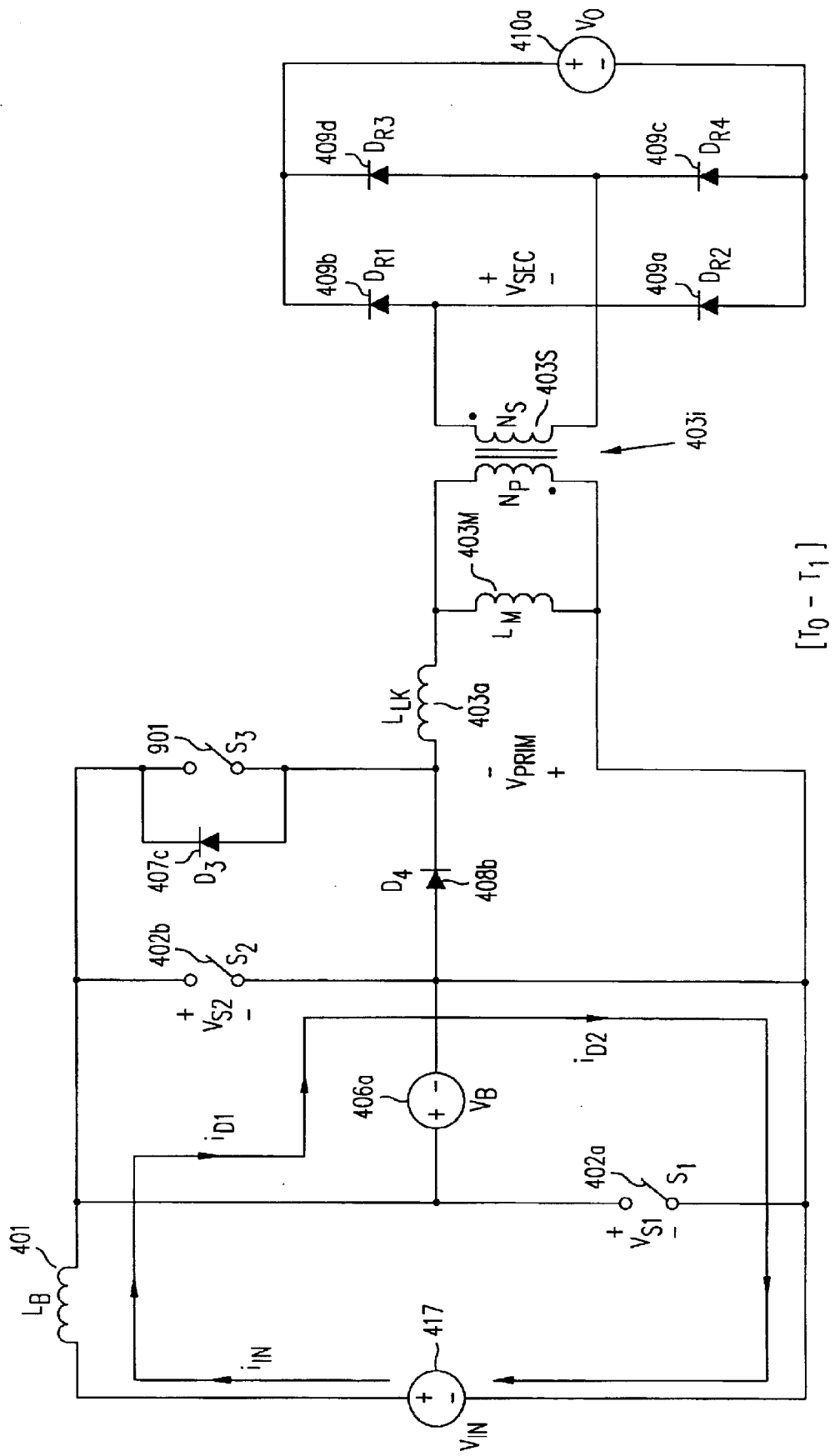

As shown in FIGS. 12(a)–(b), at time $T_0$, switches 402a, 402b and 901 are in the "off" state, so that input current $i_{IN}$ flows in rectifiers 407a and 407b (i.e., diodes $D_1$ and $D_2$), as illustrating in FIG. 11(a). Assuming that at time $T_0$, transformer 403 is completely reset (i.e. magnetizing current $i_M$ is zero at time $T_0$), no other current is flowing in converter 900 until time $T_1$, when switch 901 becomes conducting. As voltage $V_B$ in a boost converter is greater than input voltage $V_{IN}$, during time interval [$T_0$, $T_1$], input current $i_N$ decreases with a constant slope, as illustrated by waveform 1206 in FIG. 12(f). As a result, currents $i_{D1}$ and $i_{D2}$ of rectifiers 407a and 407b also decrease with the slope given in equation (1) above.

Figure 11B:
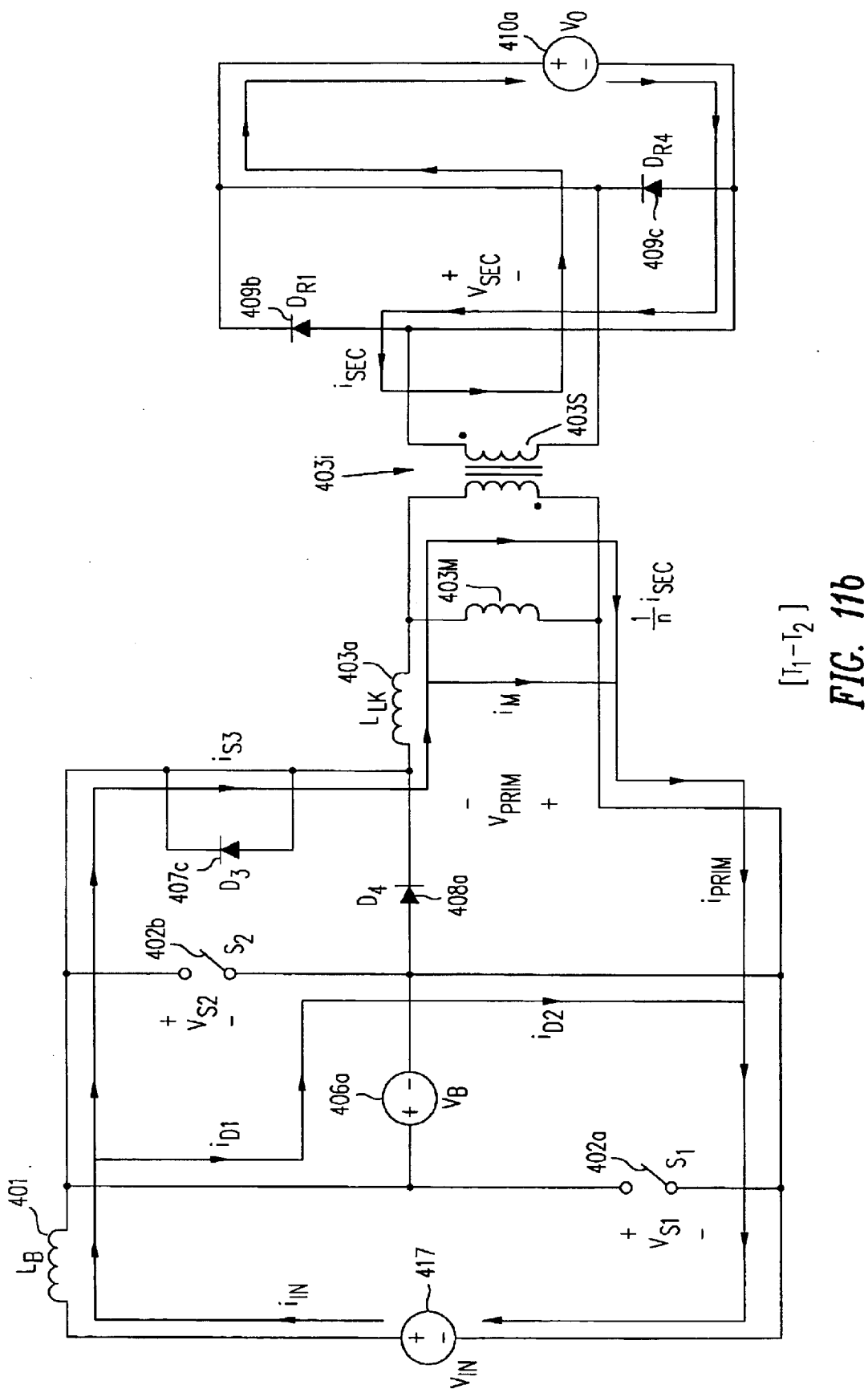

At time $T_1$, after switch 901 becomes conducting, primary current $i_{PRIM}$ in primary winding 404 of transformer 403, and secondary current $i_{SEC}$ in secondary winding 405 of transformer 403 begin to flow because voltage $V_B$ of voltage source 406a, which models energy storage capacitor 406, appears in parallel with primary winding 404 of transformer 403 (i.e., $V_{PRIM}=-V_B$). During time interval [$T_1$, $T_2$] secondary voltage $V_{SEC}$ across secondary winding 405 of transformer 403 is negative, and secondary current $I_{SEC}$ is carried by rectifiers 409a and 409d (i.e., diodes $D_{R2}$ and $D_{R3}$). As illustrated in FIG. 11(b), secondary current $i_{SEC}$ in secondary winding 405 of transformer 403 during time interval [$T_1$, $T_2$] is given by:

$$i_{SEC} = n \cdot [i_{PRIM} + i_M], \quad (17)$$

where primary current $i_{PRIM}$ in primary winding 404 of transformer 403 and magnetizing current $i_M$ in magnetizing inductor 403m are provided, respectively, by:

$$i_{PRIM} = -\frac{V_B - nV_O}{L_{LK}} \cdot t \quad (18)$$

$$i_M = \frac{nV_O}{L_M} \cdot t \quad (19)$$

Thus, $$i_{SEC} = n \cdot \left[ -\frac{V_B - nV_O}{L_{LK}} + \frac{nV_O}{L_M} \right] \cdot t \quad (20)$$

Equations (18) and (20) show that, during time interval [$T_1$, $T_2$], primary current $i_{PRIM}$ and secondary current $i_{SEC}$ increase linearly in the negative direction from a zero value at time $T_1$, as illustrated by waveforms 1207 and 1212 in FIGS. 12(g) and (l). Also, during this time interval, input current $i_{IN}$ (waveform 1206) and diode currents $i_{D1}$ and $i_{D2}$ (waveforms 1210 and 1211, FIGS. 12(j) and (k)) continue to flow. The rate of decrease in input current $i_{IN}$ is given by equation (1), and the rates of current decrease in diode currents $i_{D1}$ and $i_{D2}$ are given by:

$$\frac{di_{D1}}{dt} = \frac{di_{D2}}{dt} = \frac{V_{IN} - V_B}{L_B} - \frac{V_B - nV_O}{L_{LK}} \quad (21)$$

Figure 11C:
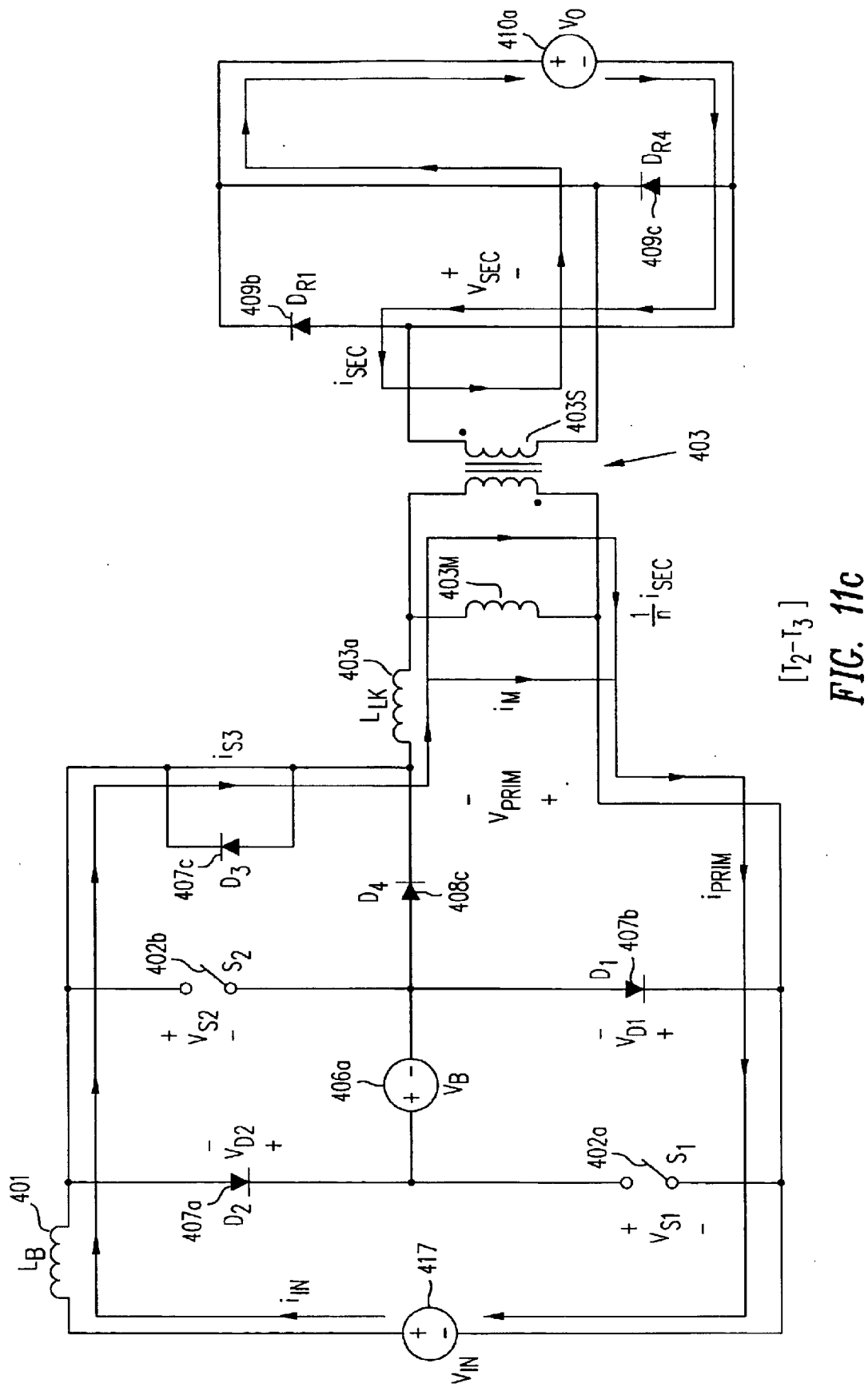
Figure 11D:
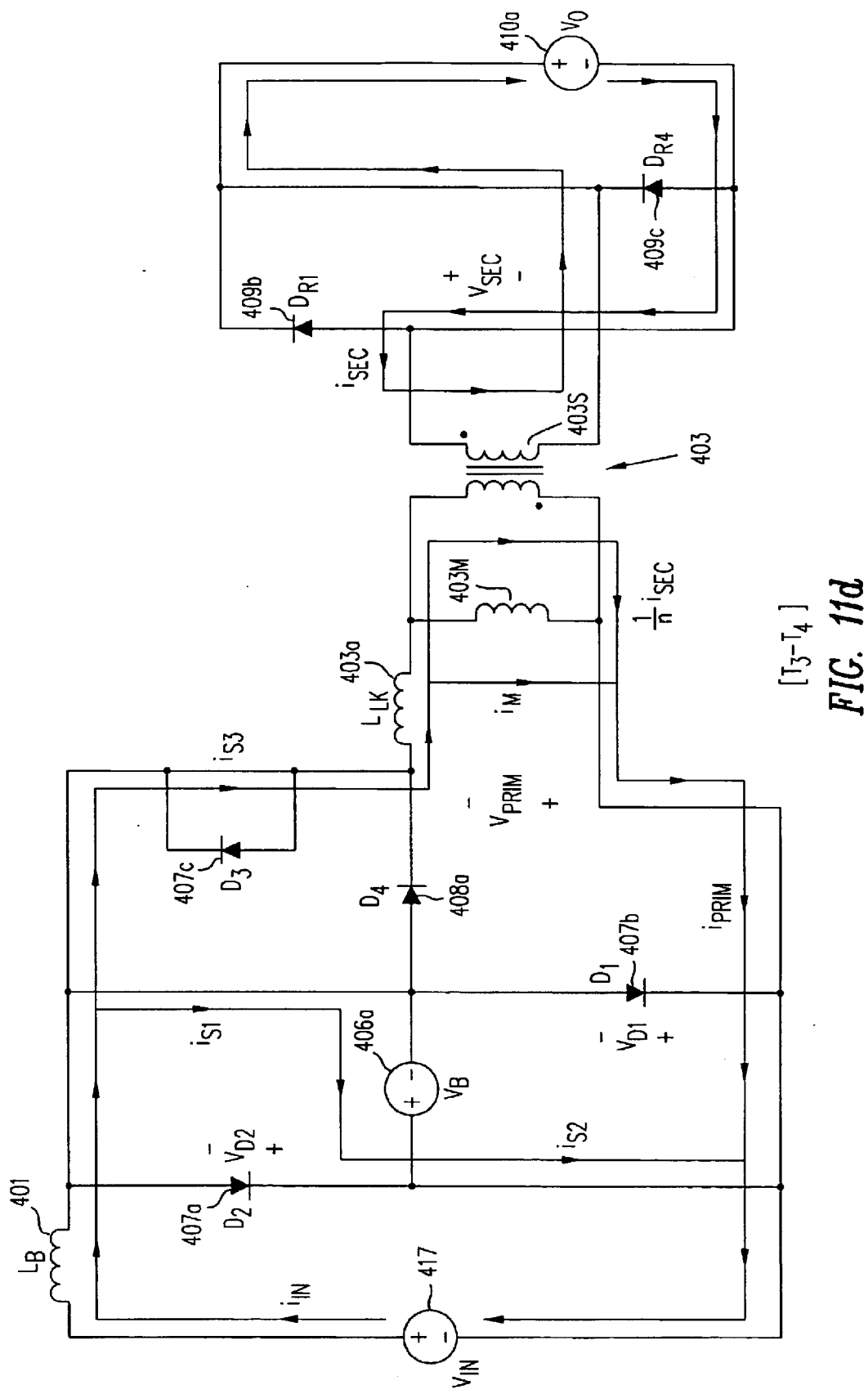

At time $T_2$, when diode currents $i_{D1}$ and $i_{D2}$ of rectifiers 407a and 407b respectively become zero, as illustrated in FIG. 11(c), input current $i_{IN}$ and primary current $i_{PRIM}$ (waveform 1207, FIG. 12(g)) in primary winding 404 of transformer 403 are equal, and continue to decrease with the same rate, as given by equation (1), until switches 402a and 402b are simultaneously turned on by signals $S_1$ and $S_2$ (waveform 1201, FIG. 12(a)) at time $T_3$. As seen from FIG. 11(c), during time interval [$T_2$, $T_3$], voltages $V_{D1}$ and $V_{D2}$ across rectifiers 407a and 407b are given by:

$$V_{D1} = V_{D2} = \frac{1}{2}\left(nV_O - V_B + L_{LK}\frac{di_{PRIM}}{dt}\right) \quad (22)$$

At the beginning of time interval [$T_3$, $T_4$], primary voltage $V_{PRIM}$ across primary winding 404 of transformer 403 changes polarity (i.e., $V_{PRIM}=V_B$), and primary current $i_{PRIM}$ begins to increase, thereby causing corresponding increases in switch currents $i_{S1}$ and $i_{S2}$ (waveform 1209, FIG. 12(i)) of switches 402a and 402b, and in secondary current $i_{SEC}$ (waveform 1212, FIG. 12(l)) in secondary winding 405 of transformer 403. The rate of increase in primary current $i_{PRIM}$ is given by $$\frac{di_{PRIM}}{dt} = \frac{V_B + nV_O}{L_{LK}} \quad (23)$$

Figure 11E:
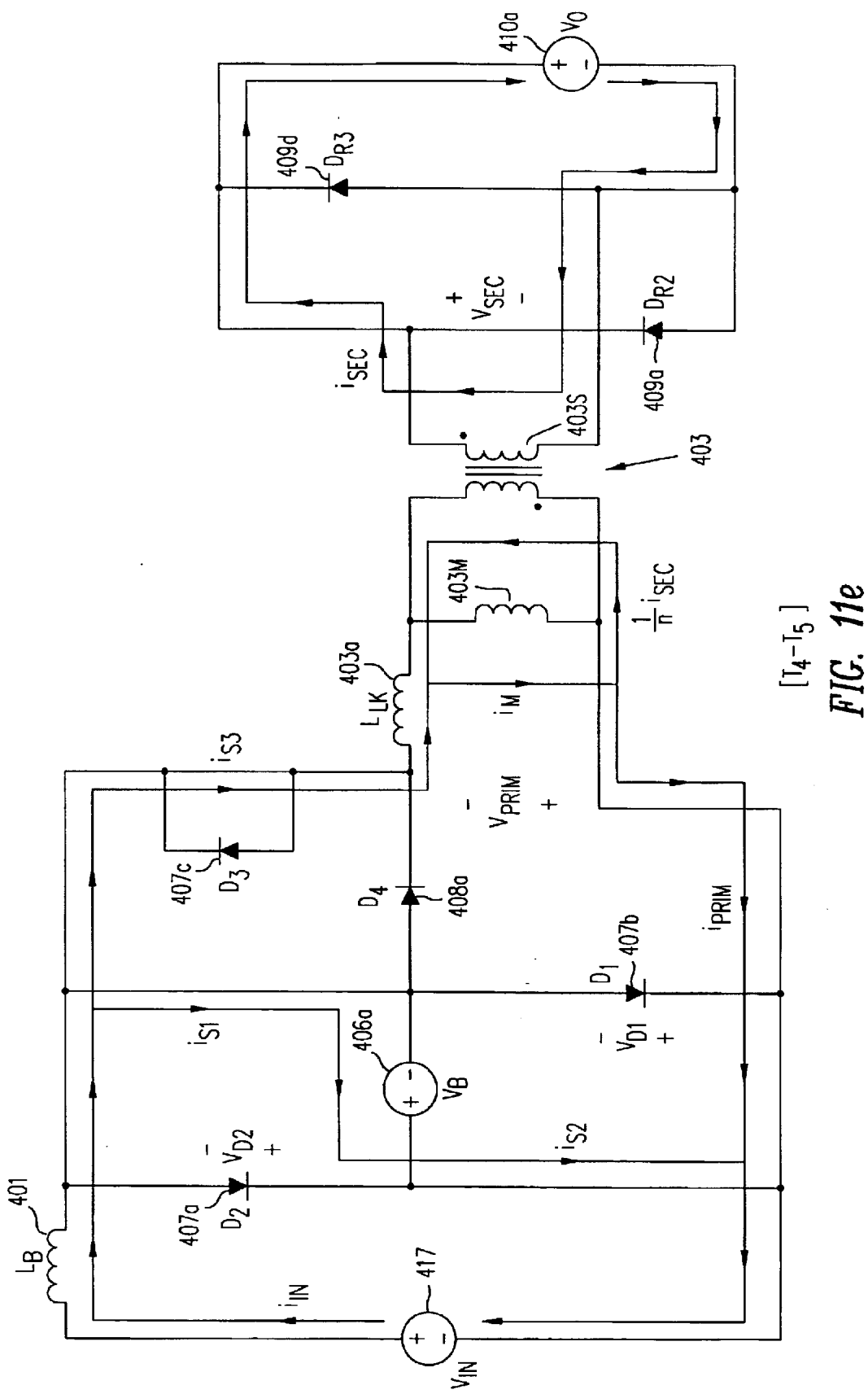
Figure 11F:
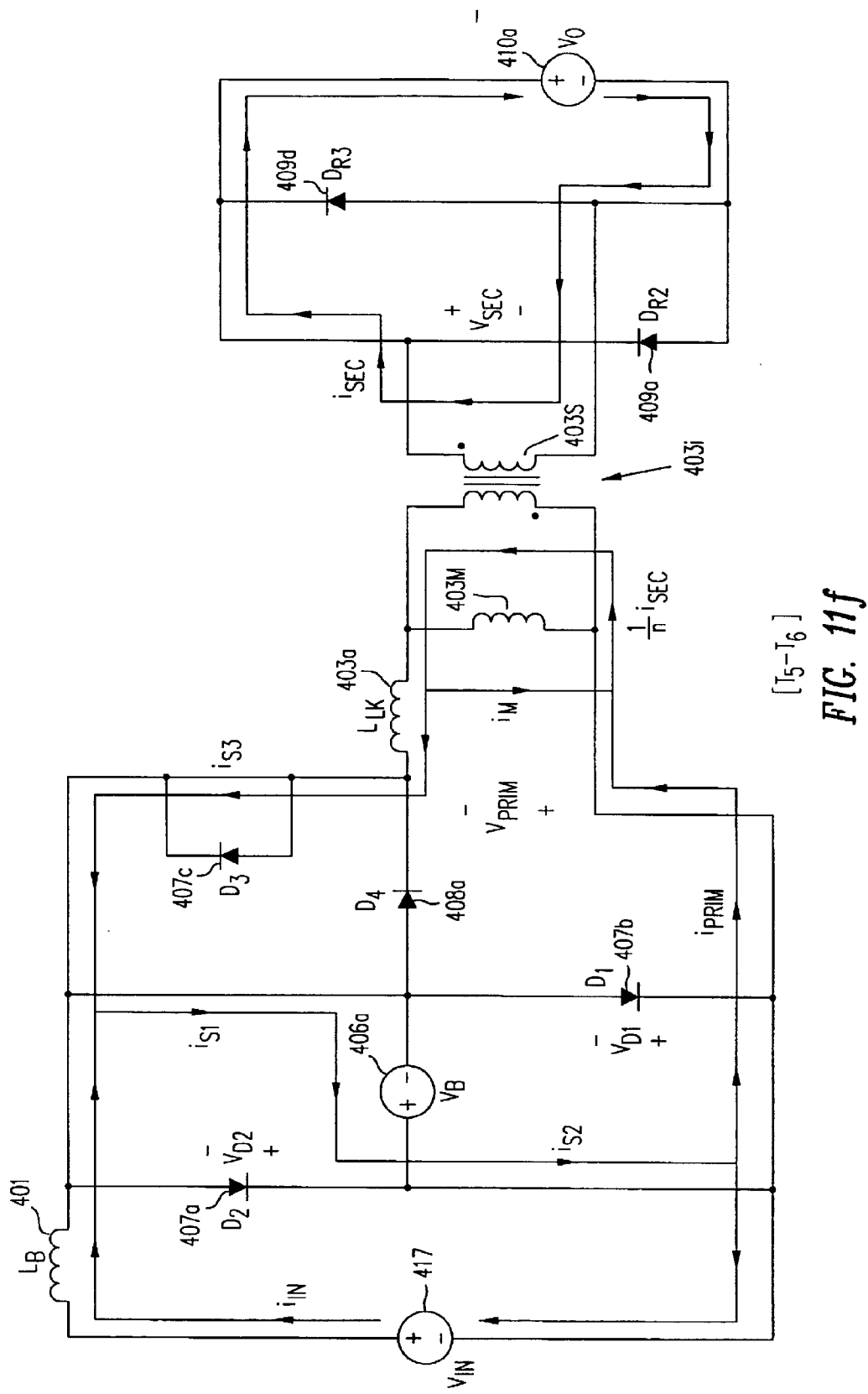
Figure 11G:
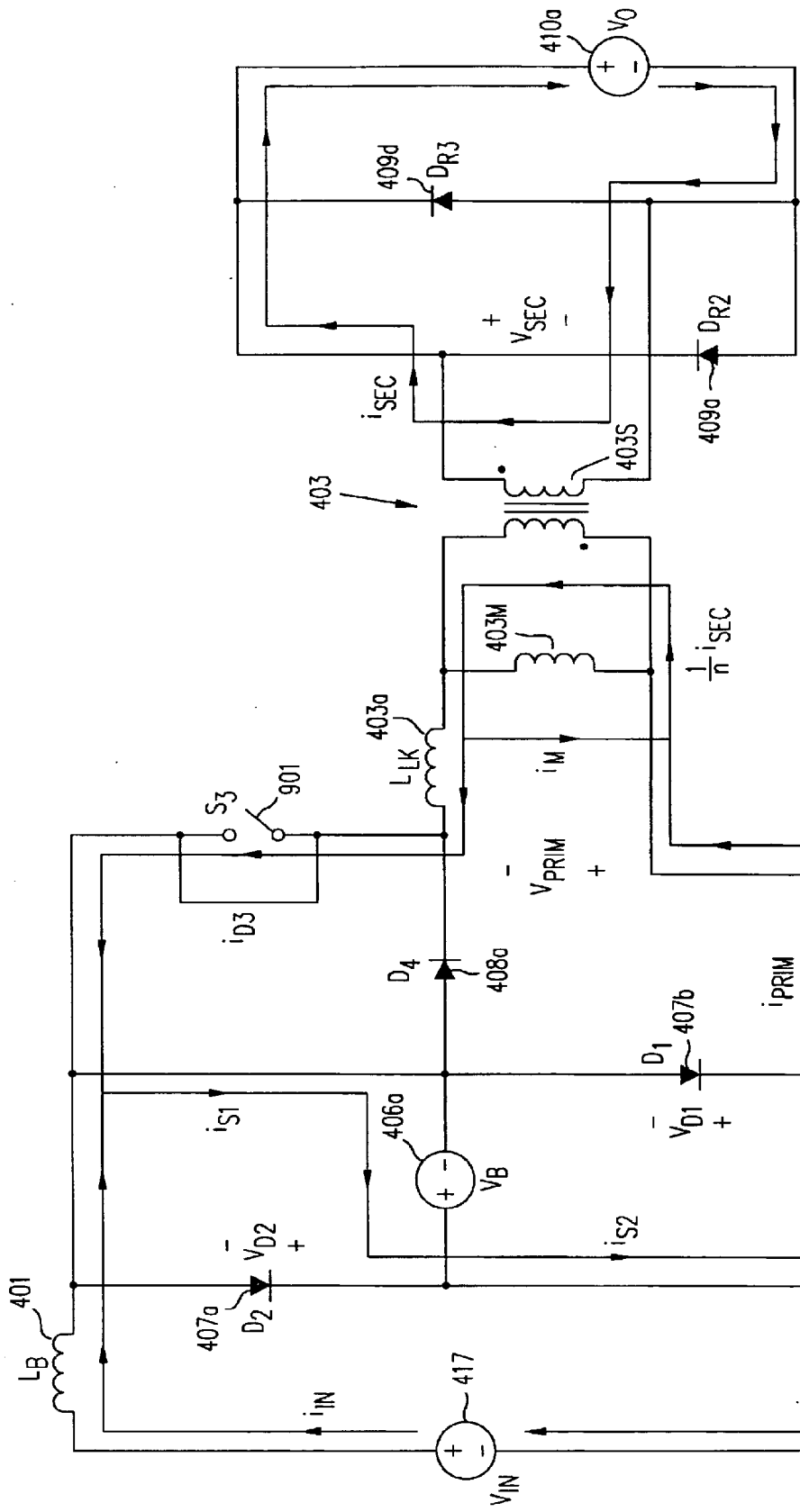
Figure 11H:
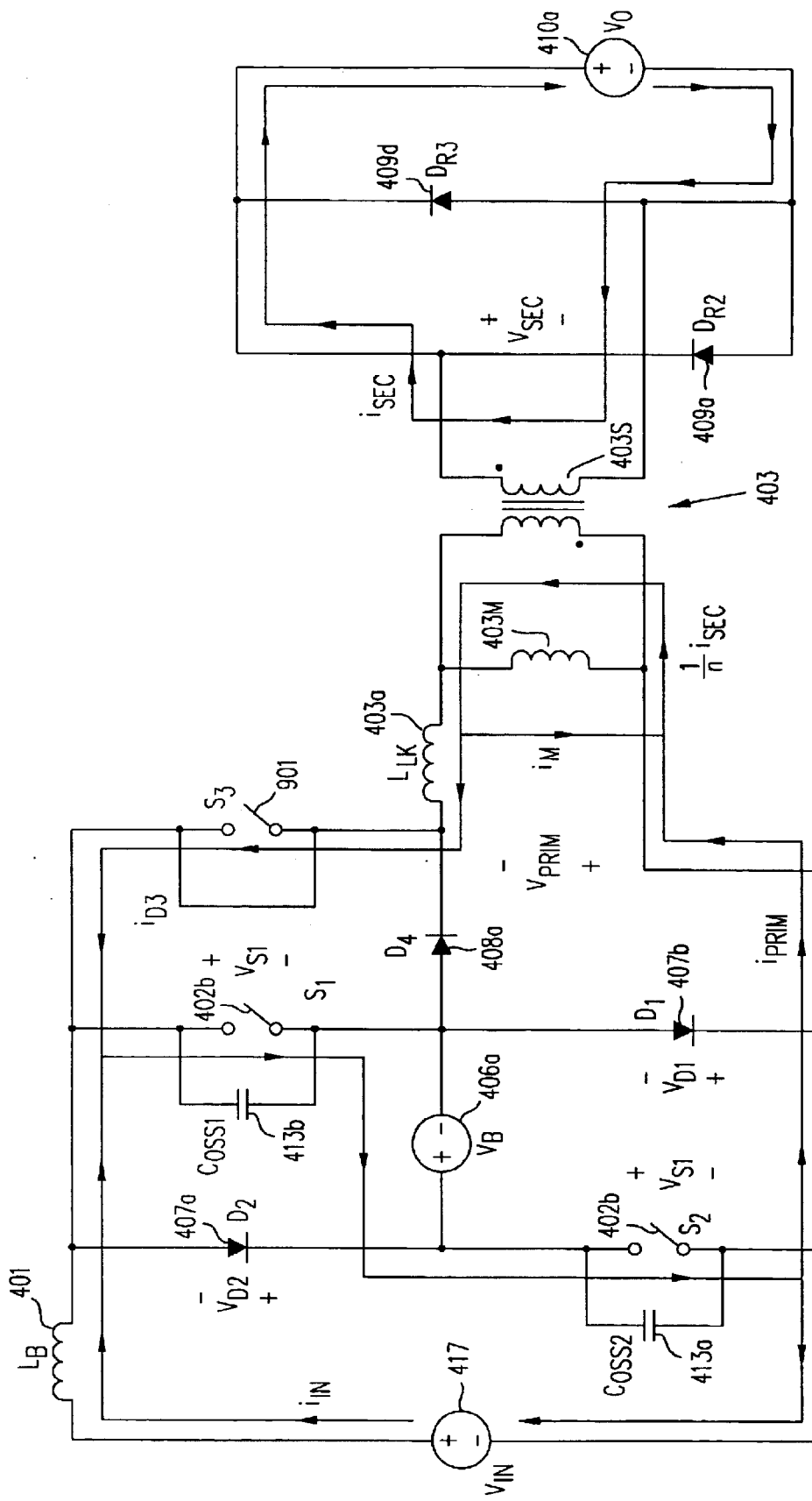
Figure 11I:
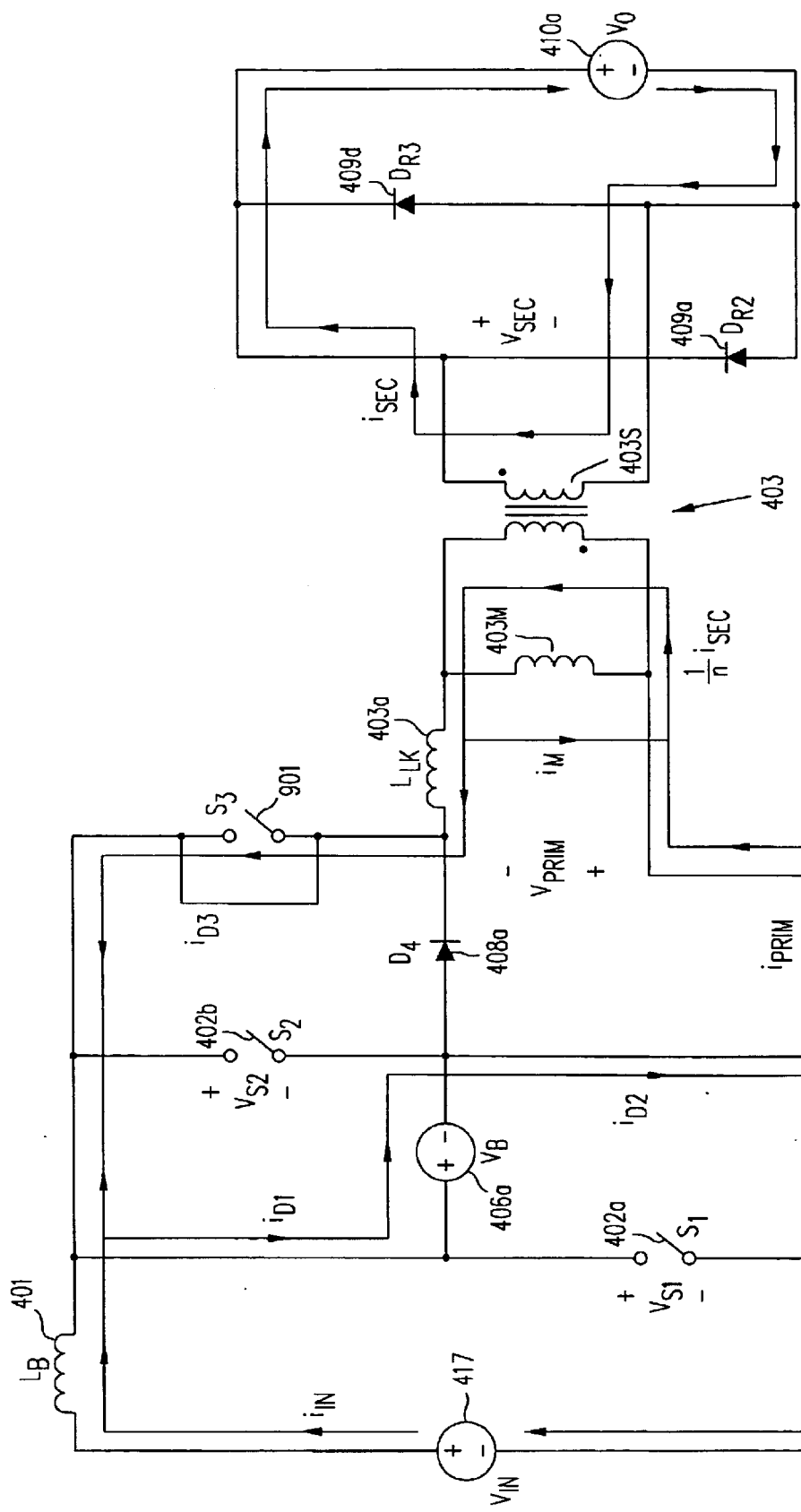
Figure 11J:
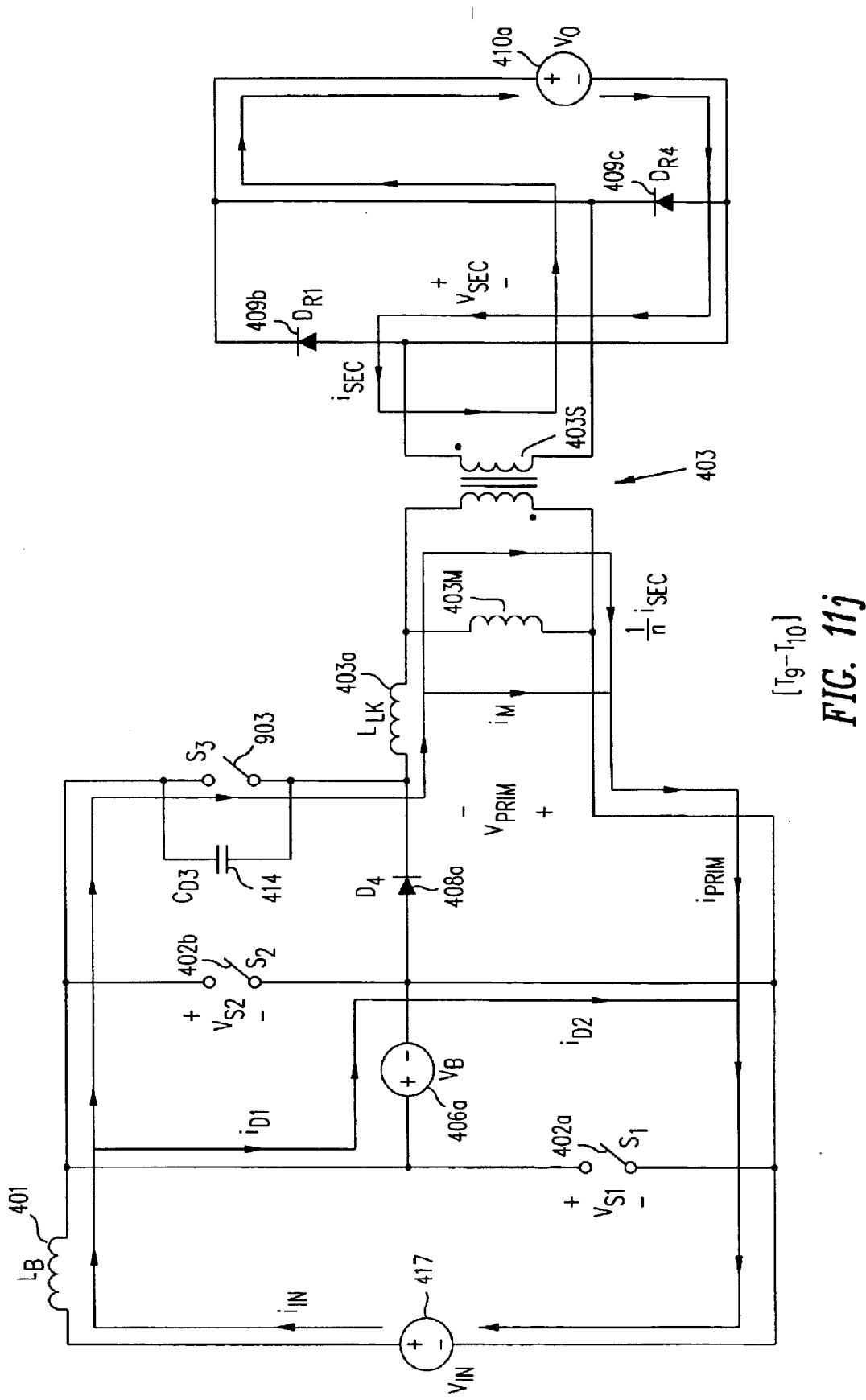
Figure 11L:
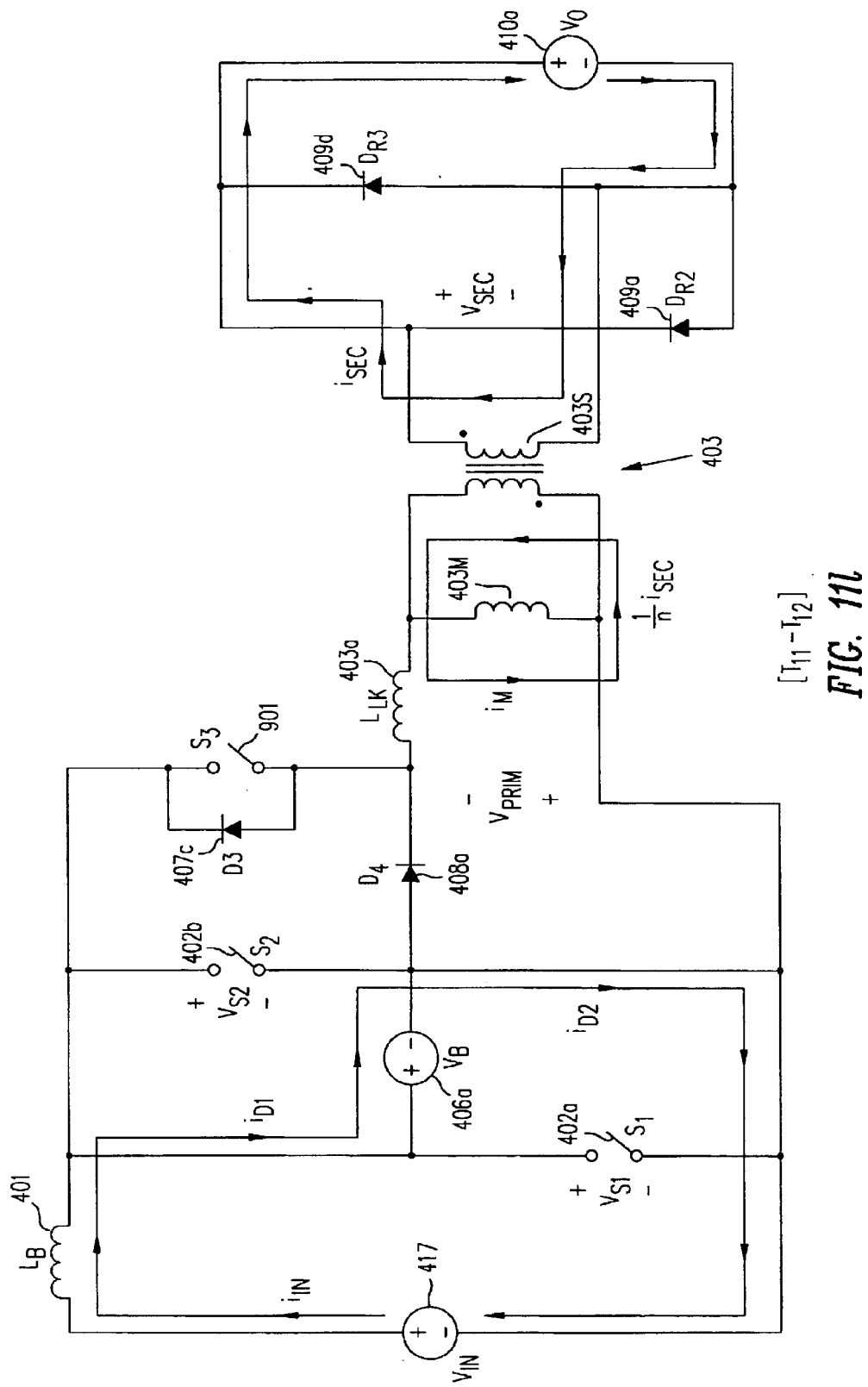

At time $T_4$, as illustrated in FIG. 11(e), secondary current $i_{SEC}$ becomes zero, so that rectifiers 409a and 409d (i.e., $D_{R2}$ and $D_{R3}$) stop conducting and secondary current $i_{SEC}$ starts flowing through rectifiers 409b and 409c (i.e., $D_{R1}$ and $D_{R4}$). At time $T_4$, secondary voltage $V_{SEC}$ (waveform 1213, FIG. 12(m)) changes polarity, so that the rate of change of primary current $i_{PRIM}$ changes to $$\frac{di_{PRIM}}{dt} = \frac{V_B - nV_O}{L_{LK}} \quad (24)$$

thereby causing corresponding changes in the rates of change in currents is $i_{S1}$, $i_{S2}$, and $i_{SEC}$, as shown in waveforms 1209 and 1212, FIGS. 12(i) and (l), respectively.

After primary current $i_{PRIM}$ changes polarity at time $T_5$, switch 901 is turned off by signal $S_3$ under zero voltage switching ("ZVS") condition. As illustrated in FIG. 12(b), switch 901 is turned off by signal $S_3$ at time $T_6$, just before switches 402a and 402b are turned off by signals $S_1$ and $S_2$ to minimize the conduction time of the body diodes in these switches. Once switch 901 is turned off, and primary current $i_{PRIM}$ is diverted to the body diodes of the switches, the operations of converter 900 for the remainder of the switching cycle are substantially the same as those of converter 400 of FIG. 4. Specifically, the operations of converter 900 of FIG. 9 between times $T_6$ and $T_{12}$ are substantially the same as the operations of converter of FIG. 4 between times $T_2$ and time $T_8$. To simplify this detailed description, the operations of converter 900 of FIG. 9 between times $T_6$ and $T_{12}$ are not described, but disclosed graphically in FIGS. 11(g)–(l). The operations of converter 900, as illustrated in FIGS. 11(g)–(l) are substantially similar, therefore comparable, to the operations of converter 400, as illustrated in FIGS. 6(c)–(h).

Figure 13:
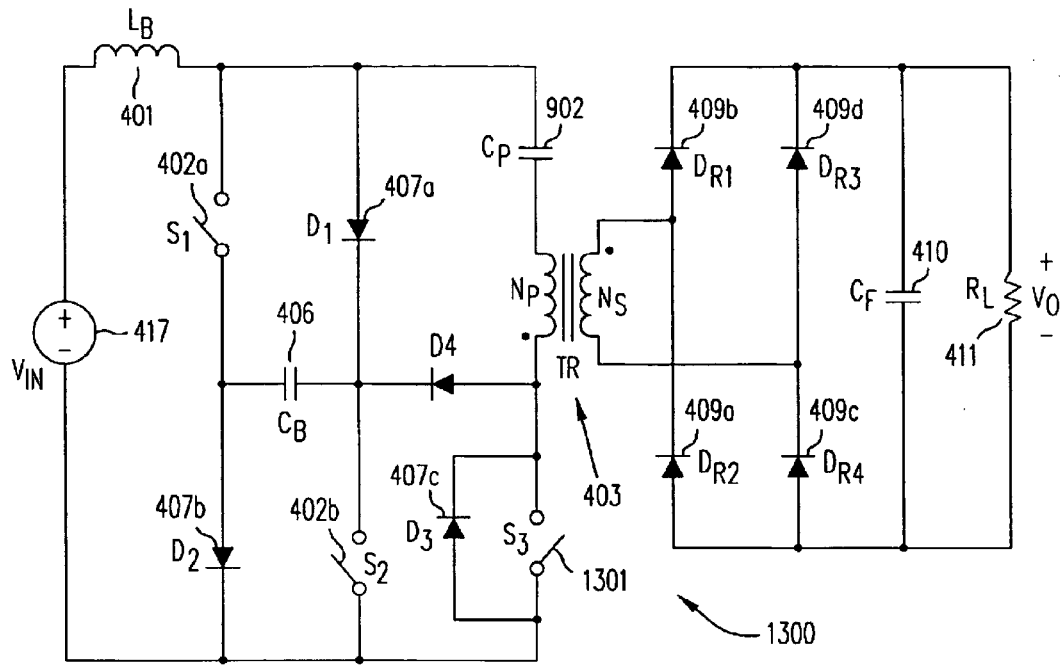
FIG. 13 shows isolated boost converter 1300, which is an alternative implementation of converter 900 of FIG. 9, using a ground-referenced third switch.

Converter 900 of FIG. 9 can also be implemented with a ground-referenced third switch 1301, as shown in FIG. 13. In isolated boost converter 900, switch 901 requires a high-side driver. In isolated boost converter 1300, a more cost-effective low-side driver is used to for switch 1301.

Isolated boost converters 900 and 1300 of FIGS. 9 and 13, respectively, can also each be implemented with a different drive-signal timing. Specifically, switches 402a and 402b can be turned on simultaneously before switch 901 or 1301 is turned on and switches 402a and 402b can be turned off substantially before switch 901 or 1301 is turned off. Such switching sequence in the main and auxiliary switches allows switch 901 or 1301 to achieve ZVS conditions, and to extended the range of operation of the circuit when boost inductor 401 operates in the discontinuous current mode ("DCM"). The switching pattern shown in FIGS. 12(a) and 12(b) is preferred when elimination of the reverse-recovery-related losses and EMC problems of rectifiers 407a and 407b (i.e., diodes $D_1$ and $D_2$) is a priority.

The waveforms of secondary current $i_{SEC}$ of converters 900 and 1300, respectively shown in FIGS. 7(k) and 12(l), show that, for the same average rectified secondary current $i_{SEC}$, the peak of secondary current $i_{SEC}$ in converter 900 of FIG. 9 is approximately one-half of that of converter 400 of FIG. 4. Further, the voltage conversion ratio of converter 900 of FIG. 9 is given by $$\frac{nV_O}{V_{IN}} \approx \frac{1}{1-2D} - \frac{1}{nD^2}I_{ON} \quad (25)$$

where $I_{ON}$ is defined in equation (14) and the range of duty cycles D is 0 to 0.5.

Figure 14:
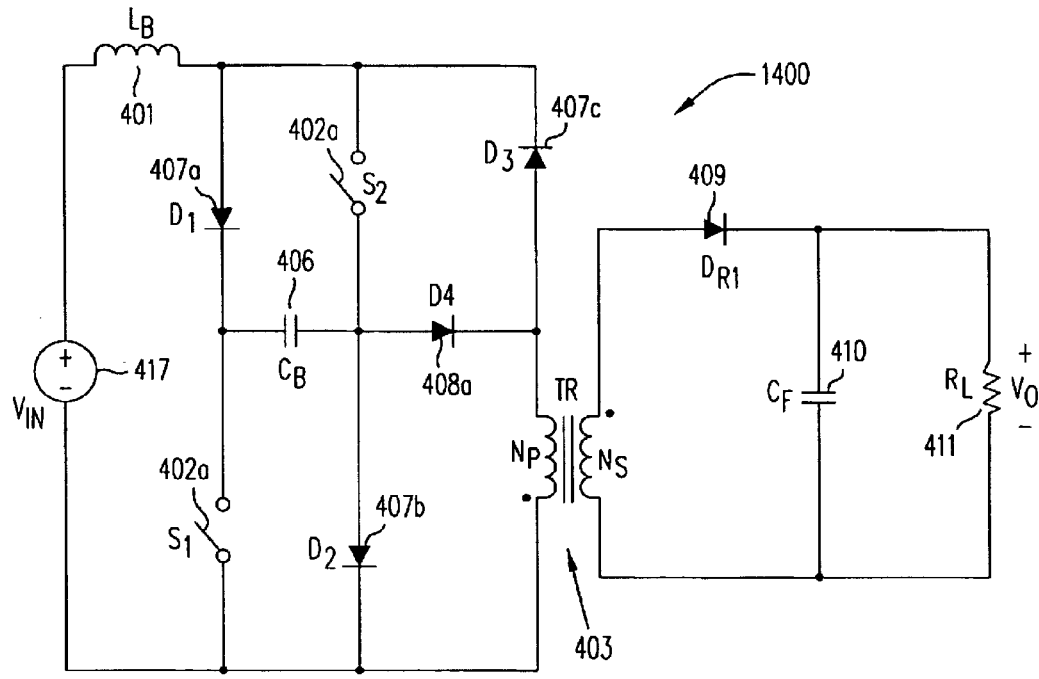
FIG. 14 shows isolated boost converter 1400, which is an alternative implementation of converter 400 of FIG. 4, using a half-wave rectifier.
Figure 15:
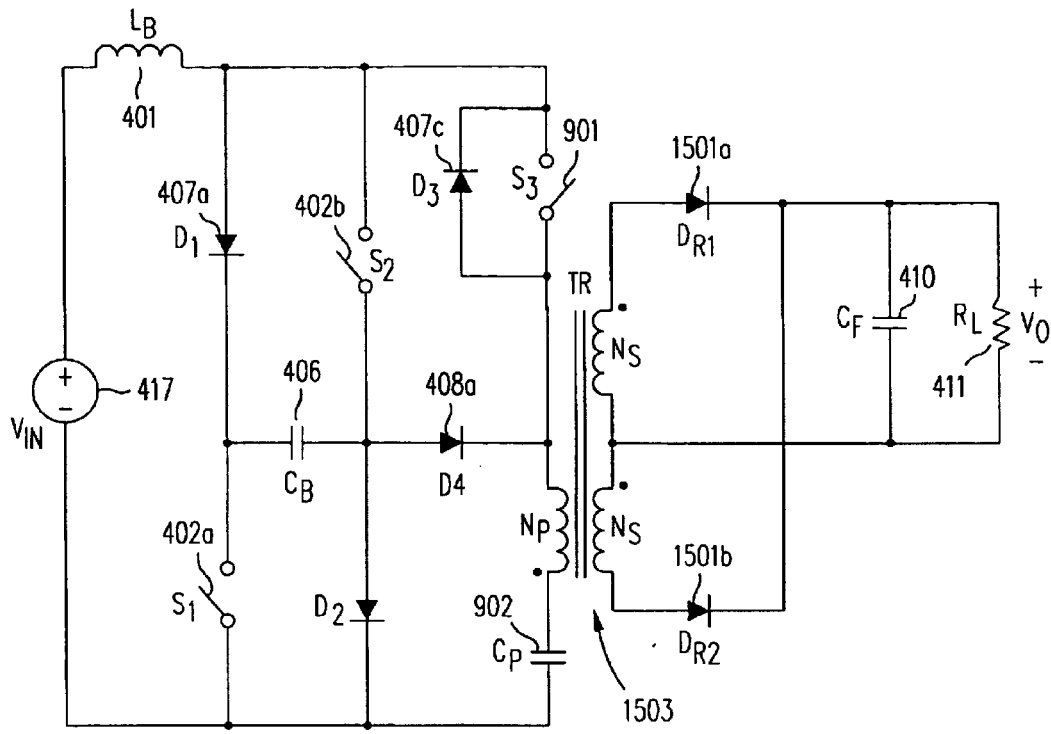
FIG. 15 shows isolated boost converter 1500, which is an alternative implementation of converter 900 of FIG. 9, using a full-wave rectifier and a center-tap transformer.
Figure 16:
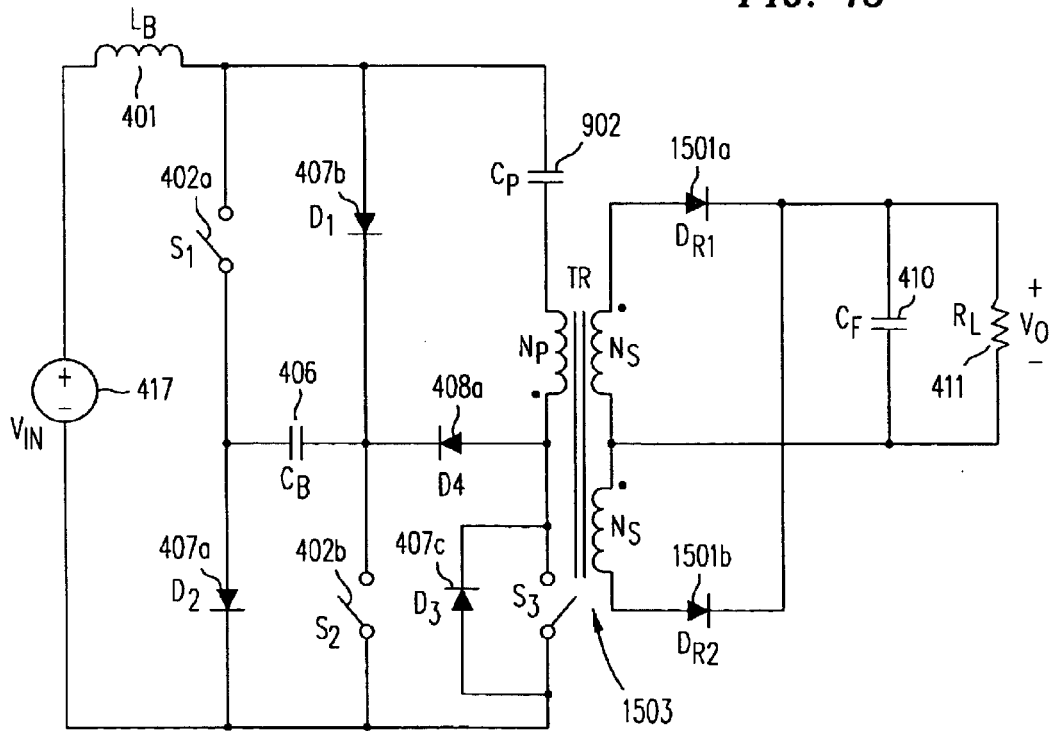
FIG. 16 shows isolated boost converter 1600, which is an alternative implementation of converter 1300 of FIG. 13, using a full-wave rectifier and a center-tap transformer.

Isolated boost converters of the present invention can be implemented with a different types of rectifiers. For example, FIG. 14 shows converter 1400, which is an alternative implementation of converter 400 of FIG. 4, using half-wave rectifier 409. Similarly, FIGS. 15 and 16 show isolated boost converters 1500 and 1600, respectively, which are alternative implementations of isolated boost converter 900 of FIG. 9, using full-wave rectifier consisting of rectifiers 1501a and 1501b, and transformer 1503 having a center-tap secondary winding.

Figure 17:
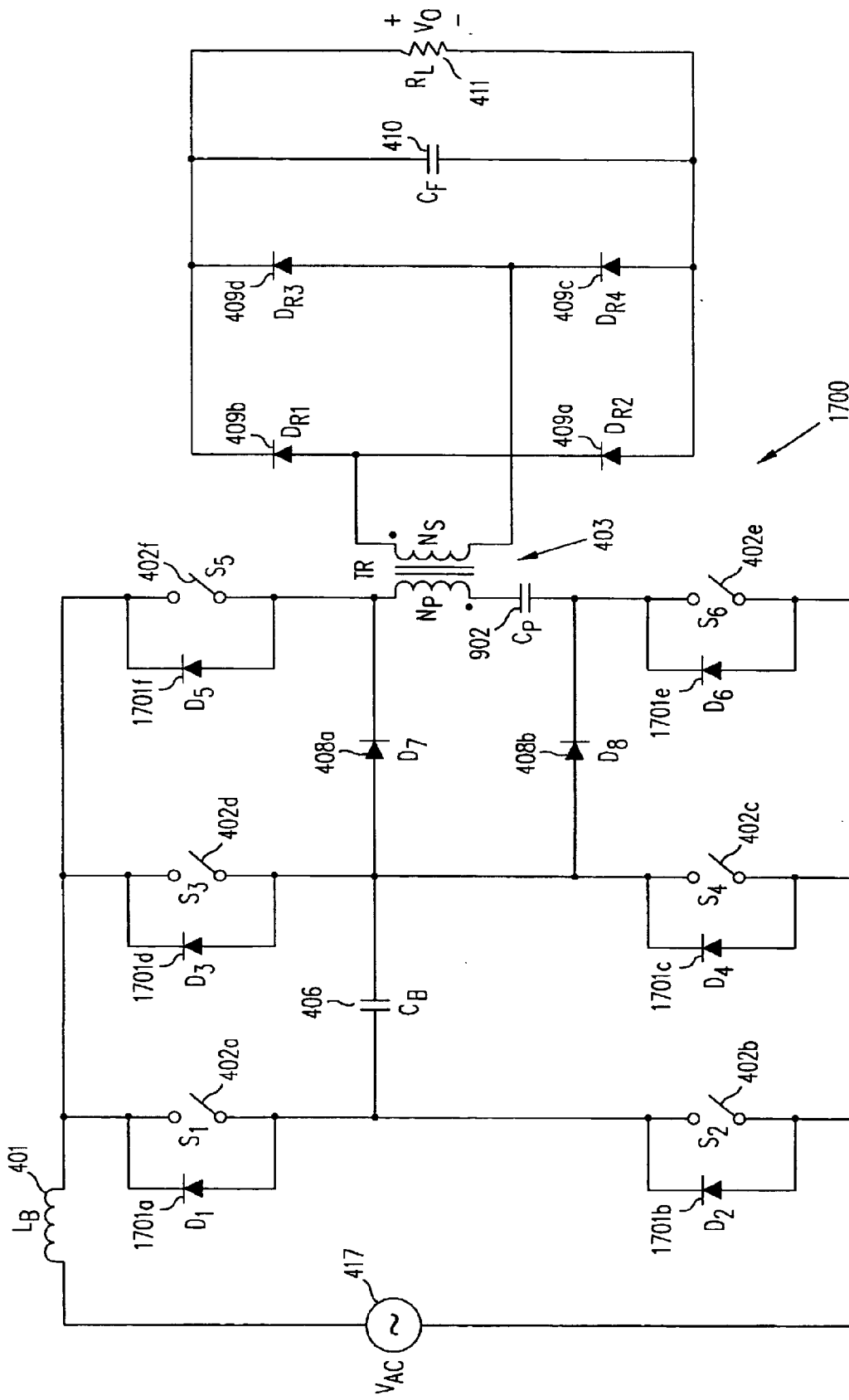
FIG. 17 shows isolated boost converter 1700, having an AC input, but without input rectifier and full-bridge, full-wave output rectifier, in accordance with one embodiment of the present invention.
Figure 18:
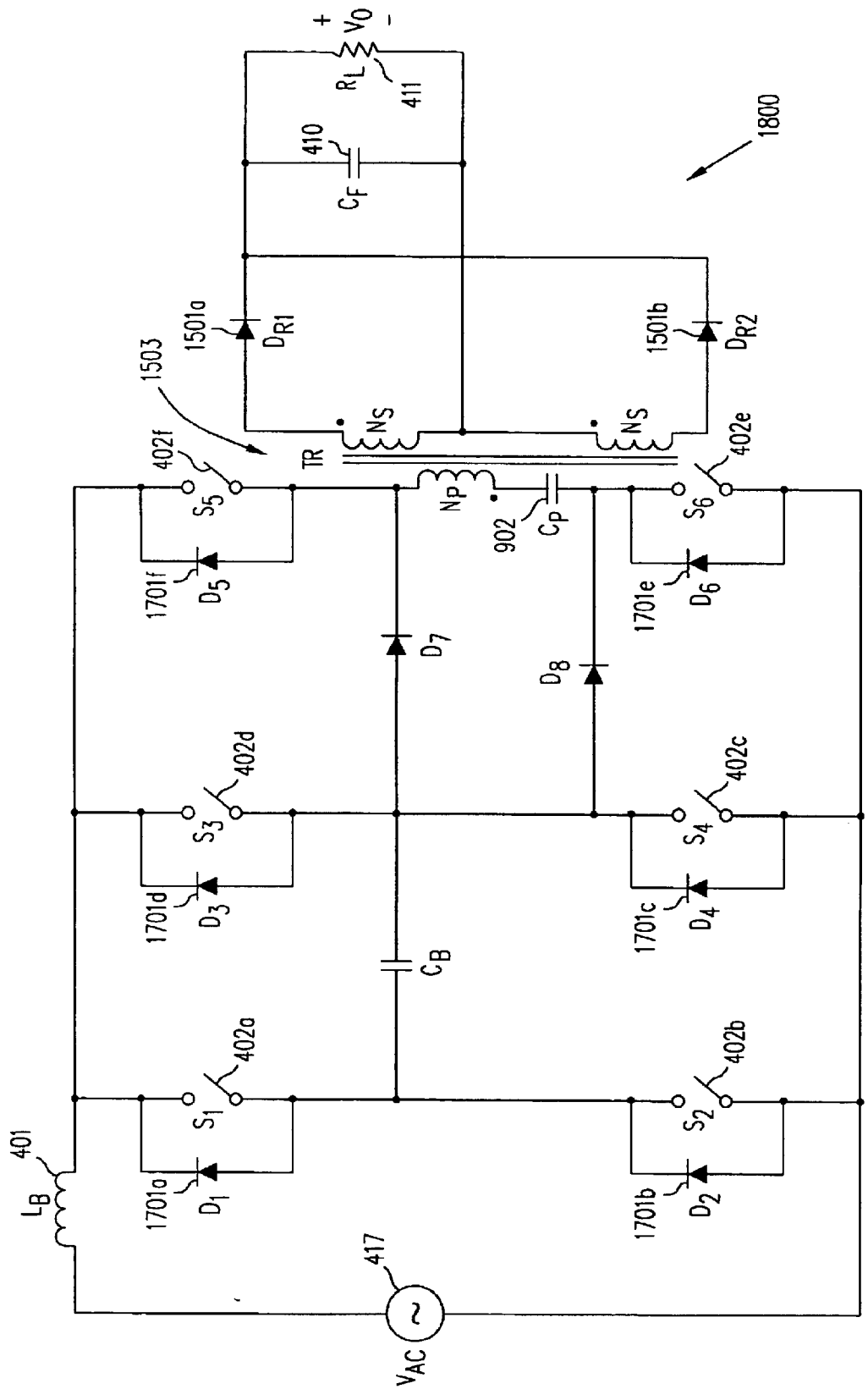
FIG. 18 shows isolated boost converter 1800, having an AC input, but without input rectifier and full-wave output rectifier with center-tap transformer, in accordance with one embodiment of the present invention.

When used in AC/DC applications, such as PFC applications, the isolated boost converters of the present invention can be implemented without an input rectifier. For example, FIG. 17 shows isolated boost converter 1700 for use in an AC/DC application, without requiring an input rectifier that employs full-bridge, full-wave output. As shown in FIG. 17, the primary side of converter 1700 includes primary switches 402a–402f, and can be viewed as a combination of two three-switch boost converters, such as converters 900 and 1300 of FIGS. 9 and 13 by replacing rectifiers 407a and 407b by switches 402a and 402d. During each line half cycle, isolated boost converter of FIG. 17 operates in a manner similar to converter 900 of FIG. 9. Specifically, during the positive line half cycles, switches 402a, 402c and 402e are periodically turned on and off while switches 402b, 402d, and 402f are kept continuously off. Similarly, during the negative line half cycles, switches 402b, 402d, and 402f are periodically turned on and off while switches 402a, 402c and 402e are kept continuously off. Isolated boost converter 1700 can also be implemented using different output rectifiers. For example, isolated boost converter 1800 of FIG. 18 shows an alternative implementation of isolated boost converter 1700, using full-wave rectifier 1501, consisting of rectifiers 1501a and 1501b, and transformer 1503 with a center-tap secondary winding.

In addition, isolated boost converters of the present invention can be implemented with, for example, passive snubbers to optimize circuit performance. Generally, any known snubber can be employed.

The detailed description above is provided to illustrate the specific embodiments of the present invention and is not intended to be limiting. Numerous modifications and variations within the scope of the present invention are possible. The present invention is set forth in the following claims.

We claim:

1. An isolated boost converter for driving an output load, comprising:

an input voltage source;

a boost inductor connected in series with the input voltage source;

a storage capacitor which receives energy from the input voltage source, the storage capacitor having a first terminal and a second terminal;

a transformer including a primary winding and secondary winding, the primary winding having a first terminal and a second terminal;

first and second switches that, when both closed, couple the first terminal and the second terminal of the storage capacitor to the first terminal and the second terminal of the primary winding of the transformer, respectively, in a series connection;

a clamp diode coupling the first terminal of the storage capacitor to the first terminal of the primary winding of the transformer:

an output filter coupled to the output load;

a rectifier coupling the secondary winding of the transformer to the output filter; and a switch control circuit to simultaneously open and close the first and second switches.

2. An isolated boost converter as in claim 1 further comprising a plurality of diodes providing a current path for the current of the boost inductor, when the first and second switches are open, and providing decoupling of the primary winding of the transformer, therby allowing a magnetic core of the transformer to reset.

3. An isolated boost converter as in claim 2, wherein the clamo diode clamps parasitic ringing across the primary winding of the transformer.

4. An isolated boost converter as in claim 1, wherein when the first and second switches are closed, the storage capacitor is coupled across the primary winding of the transformer, thereby transferring energy stored in the storage capacitor to the output load, while energy in the boost inductor is increased, and wherein, when the first and second switches are open, the energy stored in the boost inductor is transferred to the storage capacitor.

5. An isolated boost converter as in claim 1, wherein the output filter comprises a filter capacitor.

6. An isolated boost converter as in claim 1, wherein the output filter comprises a filter inductor and a capacitor.

7. An isolated boost converter as in claim 1, wherein the input voltage source comprises a direct current (DC) source.

8. An isolated boost converter as in claim 1, wherein the input voltage source comprises a rectified AC line voltage.

9. An isolated boost converter as in claim 1, wherein the switch control circuit simultaneously turns on and off the first and second switches.

10. An isolated boost converter as in claim 9, wherein the switch control circuit turns on and off the first and second switches at a predetermined frequency.

11. An isolated boost converter as in claim 1, wherein the switch control circuit simultaneously turns on and off the first and second switches at a variable frequency.

12. An isolated boost converter as in claim 1, wherein the switch control circuit comprises a sensing circuit and a reference circuit, and wherein the switch control circuit responds to the sensing and reference circuit to control the voltage across the output load.

13. An isolated boost converter as in claim 1, wherein the switch control circuit comprises a sensing circuit and a reference circuit, and wherein the switch control circuit responds to the sensing and reference circuits to control the current of the boost inductor.

14. An isolated boost converter as in claim 1, wherein the current of the boost inductor is maintained during an entire switching cycle.

15. An isolated boost converter as in claim 1, wherein the current of the boost inductor is zero during a portion of a switching cycle.

16. An isolated boost converter for driving an output load, comprising:

a first switch and second switch, each having a first and second terminal;

a first and second diode, the first and second diode each including an anode terminal and a cathode terminal, the anode and the cathode terminal of the first diode being connected to the first terminals of the second and first switches, respectively, and the anode and cathode terminal of the second diode connected to the second terminals of the second and first switches, respectively;

a storage capacitor that receives energy from the input voltage source, the storage capacitor being connected between the cathode terminal of the first diode and the anode terminal of the second diode;

a transformer including a primary winding and a secondary winding, the primary winding including a first terminal and a second terminal, the first terminal of the primary winding being connected to the cathode terminal of the second diode;

a third diode having an anode terminal and a cathode terminal, the anode terminal being connected to the second terminal of the primary winding and the cathode terminal being connected to the first terminal of the second switch;

a fourth diode having an anode terminal and a cathode terminal, the anode terminal connected to the anode terminal of the second diode and the cathode terminal of the fourth diode connected to the second terminal of the primary winding of the transformer;

an input voltage source connected in series with a boost inductor, the series connection of the input voltage source and the boost inductor being coupled between the anode terminal of the first diode and the second terminal of the first switch;

an output filter coupled to the output load;

a rectifier coupling the secondary winding of the transformer to the output filter; and switch control circuit that simultaneously opens and closes the first and second switches.

17. An isolated boost converter as in claim 16, wherein when the first and second switches are closed, the storage capacitor is coupled across the primary winding of the transformer, while energy in the boost inductor is being increased, and wherein when the first and second switches are open, the energy stored in the boost inductor is transferred to the capacitor.

18. An isolated boost converter as in claim 16, wherein the output filter comprises a filter capacitor.

19. An isolated boost converter as in claim 16, wherein the output filter comprises a filter inductor and a capacitor.

20. An isolated boost converter as in claim 16, wherein the input voltage source comprises a direct current (DC) source.

21. An isolated boost converter as in claim 16, wherein the input voltage source comprises a rectified AC line voltage.

22. An isolated boost converter as in claim 16, wherein the switch control circuit simultaneously turns on and off the first and second switches at a constant frequency.

23. An isolated boost converter as in claim 16, wherein the switch control circuit simultaneously turns on and off the first and second switches at a variable frequency.

24. An isolated boost converter as in claim 16, wherein the switch control circuit comprises a sensing circuit and a reference circuit, and wherein the switch control circuit responds to the sensing circuit and the reference circuit to control the voltage across the output load.

25. An isolated boost converter as in claim 16, wherein the switch control circuit comprises a sensing circuit and a reference circuit, and wherein the switch control circuit responds to the sensing circuit and the reference circuit to control the current of the boost inductor.

26. An isolated boost converter as in claim 16, wherein the current of the boost inductor is maintained during an entire switching cycle.

27. An isolated boost converter as in claim 16, wherein the current of the boost inductor is zero during a portion of a switching cycle.

28. An isolated boost converter as in claim 16, further comprising a snubber circuit.

29. An isolated boost converter for driving an output load, comprising:

an input voltage source connected in series with a boost inductor;

a capacitor, having a first terminal and a second terminal, that receives energy from the input voltage source;

a transformer having a primary winding and secondary winding, the primary winding having a first terminal and a second terminal;

first, second, and third switches, when all closed, coupling the capacitor to the primary winding of the transformer in a series connection, wherein the first switch connects the first terminal of the capacitor to the first terminal of the primary winding, the second switch and third switch connect the second terminal of capacitor to the second terminal of the primary winding, and the second switch connect the boost inductor to the second terminal of the capacitor;

an output filter coupled to the output load;

a rectifier coupling the secondary winding of the transformer to the output filter;

a switch control circuit to periodically open and close the first, second, and third switches.

30. An isolated boost converter as in claim 29, further comprising a plurality of diodes, wherein the diodes provide a current path for the current of the boost inductor when the first and second switches are open, and wherein the diodes further provides decoupling of the primary winding of the transformer to allow a magnetic core of the transformer to reset.

31. An isolated boost converter as in claim 29, further comprising a clamp diode which clamps parasitic ringing across the primary winding.

32. An isolated boost converter as in claim 29, wherein the third switch is closed substantially before the first and second switches are simultaneously closed and wherein the third switch is open before the first and second switches are simultaneously open.

33. An isolated boost converter as in claim 32, wherein the third switch is closed, energy stored in the boost inductor is transferred to the output load and the capacitor, and when the first and second switches are closed, energy stored in the capacitor is transferred to the output load, while energy in the boost inductor connected is being increased, and when the first, second, and third switches are open, the energy stored in the boost inductor is transferred to the capacitor.

34. An isolated boost converter as in claim 29, further comprising a blocking capacitor in series with the primary winding of the transformer.

35. An isolated boost converter as in claim 29, wherein the third switch comprises an antiparallel diode.

36. An isolated boost converter as in claim 29, wherein the output filter comprises a filter capacitor.

37. An isolated boost converter as in claim 29, wherein the output filter comprises a filter inductor and a capacitor.

38. An isolated boost converter as in claim 29, wherein the input voltage source comprises a direct current (DC) source.

39. An isolated boost converter as in claim 29, wherein the input voltage source comprises a rectified ac line voltage.

40. An isolated boost converter as in claim 29, wherein the switch control circuit simultaneously turns on and off the first, second, and third switches at a constant frequency.

41. An isolated boost converter as in claim 29, wherein the switch control circuit simultaneously turns on and off the first, second, and third switches at a variable frequency.

42. An isolated boost converter as in claim 29, wherein the switch control circuit comprises a sensing circuit and a reference circuit, and wherein the switch control circuit responds to the sensing circuit and the reference circuit to control the voltage across the output load.

43. An isolated boost converter as in claim 29, wherein the switch control circuit comprises a sensing circuit and a reference circuit, and wherein the switch control circuit responds to the sensing circuit and the reference circuit to control the current of the boost inductor.

44. An isolated boost converter as in claim 29, wherein the current of the boost inductor is maintained during an entire switching cycle.

45. An isolated boost converter as in claim 29, wherein the current of the boost inductor is zero during a portion of a switching cycle.

46. An isolated boost converter for driving an output load, comprising:
- a first switch and a second switch each having a first terminal and second terminal;
- a first diode and second diode, each including an anode terminal and a cathode terminal, the anode terminal and cathode terminal of the first diode being connected to the first terminals of the first and second switches, respectively, and the anode and cathode terminal of the second diode being connected to the second terminals of the first and second switches, respectively;
- a capacitor that receives energy from the input voltage source, the capacitor being connected between the cathode terminal of the first diode and the anode terminal of the second diode;
- a transformer having a primary winding and a secondary winding, the primary winding having a first terminal and a second terminal; the first terminal of the primary winding being connected to the anode terminal of the first diode;
- a third switch having a first and second terminal, the first terminal of the third switch being connected to the second terminal of the primary winding and the second terminal of the third switch connected to the second terminal of the second switch;
- a third diode having an anode terminal and cathode terminal, the anode terminal being connected to the first terminal of the third switch and the cathode a terminal of the third diode connected to the first terminal of the second switch;
- a boost inductor;
- an input voltage source connected in series with the boost inductor, the series connection of the input source and the boost inductor coupled between the anode terminal of the first diode and the second terminal of the second switch;
- an output filter coupled to the output load,
- a rectifier coupling the secondary winding of the transformer to the output filter;
- a switch control circuit to periodically open and close the first, second, and third switches.

47. An isolated boost converter as in claim 46, wherein the third switch is closed substantially before the first and second switches are closed and wherein the third switch is open before the first and second switches are open.

48. An isolated boost converter as in claim 46, wherein the third switch is closed after the first and second switches are closed and wherein the third switch is open after the first and second switches are open.

49. An isolated boost converter as in claim 46, wherein when the third switching is closed, energy stored in the boost inductor is transferred to the output load and the capacitor, and when the first and second switches are closed, energy stored in the capacitor is transferred to the output load, while energy in the boost inductor is being increased, and when the first, second, and third switches are open the energy stored in the boost inductor is transferred to the capacitor.

50. An isolated boost converter as in claim 46, further comprising a blocking capacitor in series with the primary winding of the transformer.

51. An isolated boost converter as in claim 46, wherein the third switch comprises an antiparallel diode coupled across the first and second terminal of the third switch.

52. An isolated boost converter as in claim 46, wherein the output filter comprises a filter capacitor.

53. An isolated boost converter as in claim 46, wherein the output filter comprises a filter inductor and a capacitor.

54. An isolated boost converter as in claim 46, wherein the input voltage source comprises a direct current (DC) source.

55. An isolated boost converter as in claim 46, wherein the input voltage source comprises a rectified ac line voltage.

56. An isolated boost converter as in claim 46, wherein the switch control circuit turns on and off the first, second, and third switches at a constant frequency.

57. An isolated boost converter as in claim 46, wherein the switch control circuit simultaneously turns on and off the first, second, and third switches at a variable frequency.

58. An isolated boost converter as in claim 46, wherein the switch control circuit comprises a sensing circuit and a reference circuit, and wherein the switch control circuit responds to the sensing circuit and the reference circuit to control the voltage across the output load.

59. An isolated boost converter as in claim 46, wherein the switch control circuit comprises a sensing circuit and a reference circuit, and wherein the switch control circuit responds to the sensing circuit and the reference circuit to control the current of the boost inductor.

60. An isolated boost converter as in claim 46, wherein the current of the boost inductor is maintained during an entire switching cycle.

61. An isolated boost converter as in claim 46, wherein the current of the boost inductor is zero during a portion of a switching cycle.

62. An isolated boost converter as in claim 46, further comprising a snubber circuit.

63. An isolated boost converter for driving an output load, comprising:
- an AC input voltage source;
- a boost inductor connected in series with the AC input voltage source;
- a capacitor storing energy from the AC input voltage source;
- a transformer having a primary winding and a secondary winding;
- first, second, third, fourth, fifth, and sixth switches, coupling the capacitor and the boost inductor to the primary winding of the transformer;
- an output filter coupled to the output load;
- a rectifier coupling the secondary winding of the transformer to the output filter;
- a switch control circuit to periodically open and close the first, second, and third switches during each positive half cycles of the ac input voltage source and to periodically open and close fourth, fifth, and sixth switches during each negative cycle of the AC input voltage source.

64. An isolated boost converter as in claim 63, wherein the third switch is closed before the first and second switches are closed and wherein the third switch is open before the first and second switches are open.

65. An isolated boost converter as in claim 63, wherein the sixth switch is closed before the fourth and fifth switch are simultaneously closed and wherein the sixth switch is open before the fourth and fifth switches are open.

66. An isolated boost converter as in claim 63, wherein the third switch is closed after the first and second switches are closed and wherein the third switch is open after the first and second switches are open.

67. An isolated boost converter as in claim 63, wherein the sixth switch is closed after the fourth and fifth switches are simultaneously closed and wherein the sixth switch is open after the fourth and fifth switches are simultaneously open.

68. An isolated boost converter as in claim 63, wherein when the third switch is closed, energy stored in the boost inductor is transferred to the output load and the capacitor, and when the first and second switches are closed, energy stored in the capacitor is transferred to the output load, while energy in the boost inductor is being increased, and wherein when the first, second, and third switches are open, the energy stored in the boost inductor is transferred to the capacitor.

69. An isolated boost converter as in claim 63, wherein when the sixth switch is closed, energy stored in the boost inductor is transferred to the output load and the capacitor, and when the fourth and fifth switches are closed, energy stored in the capacitor is transferred to the output load, while energy in the boost inductor is being increased, and wherein when the fourth, fifth, and sixth switches are open, the energy stored in the boost inductor is transferred to the capacitor.

70. An isolated boost converter as in claim 63, further comprising a blocking capacitor in series with the primary winding of the transformer.

71. An isolated boost converter as in claim 63, wherein the first, second, third, fourth, fifth, and sixth switches each comprise an antiparallel diode.

72. An isolated boost converter as in claim 63, wherein the output filter comprises a filter capacitor.

73. An isolated boost converter as in claim 63, wherein the output filter comprises a filter inductor and a capacitor.

74. An isolated boost converter as in claim 63, wherein the switch control circuit simultaneously turns on and off the first, second, and third switches at a constant frequency.

75. An isolated boost converter as in claim 63, wherein the switch control circuit simultaneously turns on and off the first, second, and third switches at a variable frequency.

76. An isolated boost converter as in claim 63, wherein the switch control circuit comprises a sensing circuit and a reference circuit, and wherein the switch control circuit responds to the sensing circuit and the reference circuit to control the voltage across the output load.

77. An isolated boost converter as in claim 63, wherein the switch control circuit comprises a sensing circuit and a reference circuit, and wherein the switch control circuit responds to the sensing circuit and the reference circuit to control the current of the boost inductor.

78. An isolated boost converter as in claim 63, wherein the current of the boost inductor is maintained during an entire switching cycle.

79. An isolated boost converter as in claim 63, wherein the current of the boost inductor is zero during a portion of a switching cycle.

80. An isolated boost converter as in claim 63, further comprising a snubber circuit.

* * * * *